(12) United States Patent
Varaprasad et al.

US008864898B2

(10) Patent No.: US 8,864,898 B2
(45) Date of Patent: Oct. 21, 2014

(54) COATING FORMULATIONS FOR OPTICAL ELEMENTS

(75) Inventors: Desaraju Varaprasad, Sunnyvale, CA (US); Boris Korolev, San Jose, CA (US); Sudip Mukhopadhyay, San Jose, CA (US)

(73) Assignee: Honeywell International Inc., Morristown, NJ (US)

( * ) Notice: Subject to any disclaimer, the term of this patent is extended or adjusted under 35 U.S.C. 154(b) by 651 days.

(21) Appl. No.: 13/149,281

(22) Filed: May 31, 2011

(65) Prior Publication Data

US 2012/0308725 A1 Dec. 6, 2012

(51) Int. Cl.
| C09D 183/02 | (2006.01) |
| G02B 1/11 | (2006.01) |
| C09D 1/00 | (2006.01) |
| C09D 5/00 | (2006.01) |
| C09D 7/00 | (2006.01) |

(52) U.S. Cl.
CPC .............. *G02B 1/111* (2013.01); *C09D 183/02* (2013.01); *C09D 1/00* (2013.01); *C09D 5/006* (2013.01); *C09D 7/001* (2013.01)
USPC ............... 106/287.16; 106/287.14; 106/287.1

(58) Field of Classification Search
CPC .... C09D 5/006; C09D 183/02; C09D 183/06; C08K 5/0008; C08K 5/0016; C08K 2201/002; G02B 1/111
USPC ................ 106/287.1, 287.13, 287.14, 287.16
See application file for complete search history.

(56) References Cited

U.S. PATENT DOCUMENTS

| 31,987 A | 4/1861 | Nozaki et al. |
| 35,239 A | 5/1862 | Jacobs |
| 35,368 A | 5/1862 | Ehrman |
| 35,447 A | 6/1862 | Howard |
| 58,929 A | 10/1866 | Adams et al. |
| 106,376 A | 8/1870 | Kennedy et al. |
| 172,896 A | 2/1876 | Adams et al. |
| 677,386 A | 7/1901 | Teeguarden et al. |
| 2,783,263 A | 2/1957 | Merker |
| 2,857,356 A | 10/1958 | Goodwin, Jr. |
| 3,294,737 A | 12/1966 | Krantz |
| 3,615,272 A | 10/1971 | Collins et al. |
| 3,635,529 A | 1/1972 | Nass |
| 3,784,378 A | 1/1974 | Gramas |
| 3,873,361 A | 3/1975 | Franco et al. |
| 3,884,702 A | 5/1975 | Koshimo et al. |
| 3,925,077 A | 12/1975 | Lewis et al. |
| 3,929,489 A | 12/1975 | Arcesi et al. |
| 4,018,606 A | 4/1977 | Contois et al. |
| 4,018,607 A | 4/1977 | Contois |
| 4,019,884 A | 4/1977 | Elmer et al. |
| 4,043,812 A | 8/1977 | Stolka et al. |
| 4,048,146 A | 9/1977 | Wilson |
| 4,052,367 A | 10/1977 | Wilson |
| 4,053,313 A | 10/1977 | Fan |
| 4,102,683 A | 7/1978 | DiPiazza |
| 4,191,571 A | 3/1980 | Nonogaki et al. |
| 4,257,826 A | 3/1981 | Matalone, Jr. |
| 4,290,896 A | 9/1981 | Gordon et al. |
| 4,299,938 A | 11/1981 | Green et al. |
| 4,308,371 A | 12/1981 | Tanaka et al. |
| 4,312,970 A | 1/1982 | Gaul, Jr. |
| 4,328,262 A | 5/1982 | Kurahashi et al. |
| 4,348,471 A | 9/1982 | Shelnut et al. |
| 4,349,609 A | 9/1982 | Takeda et al. |
| 4,362,809 A | 12/1982 | Chen et al. |
| 4,363,859 A | 12/1982 | Sasaki et al. |
| 4,369,284 A | 1/1983 | Chen |
| 4,399,266 A | 8/1983 | Matsumura et al. |
| 4,413,052 A | 11/1983 | Green et al. |
| 4,413,088 A | 11/1983 | Frye |
| 4,419,437 A | 12/1983 | Noonan et al. |
| 4,423,135 A | 12/1983 | Chen et al. |
| 4,430,153 A | 2/1984 | Gleason et al. |
| 4,434,127 A | 2/1984 | Baile et al. |
| 4,440,745 A | 4/1984 | Schmidt et al. |
| 4,442,197 A | 4/1984 | Crivello et al. |
| 4,456,679 A | 6/1984 | Leyrer et al. |
| 4,483,107 A | 11/1984 | Tomoyori et al. |
| 4,510,283 A | 4/1985 | Takeda et al. |
| 4,513,132 A | 4/1985 | Shoji et al. |
| 4,515,828 A | 5/1985 | Economy et al. |
| 4,557,996 A | 12/1985 | Aoyama et al. |
| 4,563,241 A | 1/1986 | Tanaka et al. |

(Continued)

FOREIGN PATENT DOCUMENTS

| DE | 19852852 | 5/2000 |
| DE | 102006046726 | 4/2008 |
| EP | 0144880 | 11/1984 |
| EP | 0130801 | 1/1985 |
| EP | 0146411 B1 | 6/1985 |
| EP | 0152377 | 11/1985 |
| EP | 0323186 | 7/1989 |
| EP | 0184248 | 8/1989 |
| EP | 0327311 B1 | 8/1989 |
| EP | 0229629 | 4/1991 |

(Continued)

OTHER PUBLICATIONS

Dow P-series Glycol ethers, The Dow Chemical Company, Jul. 2002).*
Lyondellbasell, Arcosolv PE Solvent, LyondellBasell Holdings BV (2010).*
HD Micro Puts Out Positive Polyamide, Electronic News, Jun. 19, 2000, 1 page.
AlliedSignal ACCUSPIN® 720 Spin-On Polymer Product Bulletin, previous issue date Sep. 18, 1995; current issue date Mar. 7, 2000.

(Continued)

*Primary Examiner* — David M Brunsman
(74) *Attorney, Agent, or Firm* — Faegre Baker Daniels LLP (57) ABSTRACT

Anti-reflective coatings and coating formulations, optical elements and processes for preparing coating formulations and optical elements are described. The coating formulations are formed from at least one alkoxysilane material and at least one high boiling solvent. The coating formulation may be applied using roller coat processes.

27 Claims, 2 Drawing Sheets

(56) References Cited

U.S. PATENT DOCUMENTS

| | | |
|---|---|---|
| 4,587,138 A | 5/1986 | Yau et al. |
| 4,594,309 A | 6/1986 | Guillet |
| 4,595,599 A | 6/1986 | Brown et al. |
| 4,600,685 A | 7/1986 | Kitakohji et al. |
| 4,603,168 A | 7/1986 | Sasaki et al. |
| 4,609,614 A | 9/1986 | Pampalone et al. |
| 4,617,252 A | 10/1986 | Cordes, III et al. |
| 4,618,213 A | 10/1986 | Chen |
| 4,620,986 A | 11/1986 | Yau et al. |
| 4,624,912 A | 11/1986 | Zweifel et al. |
| 4,626,556 A | 12/1986 | Nozue et al. |
| 4,657,843 A | 4/1987 | Fukuyama et al. |
| 4,657,965 A | 4/1987 | Watanabe et al. |
| 4,663,414 A | 5/1987 | Estes et al. |
| 4,670,299 A | 6/1987 | Fukuyama et al. |
| 4,674,176 A | 6/1987 | Tuckerman |
| 4,676,867 A | 6/1987 | Elkins et al. |
| 4,678,835 A | 7/1987 | Chang et al. |
| 4,681,795 A | 7/1987 | Tuckerman |
| 4,687,216 A | 8/1987 | Kawamoto et al. |
| 4,693,959 A | 9/1987 | Ashcraft |
| 4,702,990 A | 10/1987 | Tanaka et al. |
| 4,705,729 A | 11/1987 | Sheats |
| 4,705,739 A | 11/1987 | Fisch |
| 4,708,925 A | 11/1987 | Newman |
| 4,723,978 A | 2/1988 | Clodgo et al. |
| 4,731,264 A | 3/1988 | Lin et al. |
| 4,732,858 A | 3/1988 | Brewer et al. |
| 4,745,169 A | 5/1988 | Sugiyama et al. |
| 4,746,693 A | 5/1988 | Meder |
| 4,752,649 A | 6/1988 | Neckers |
| 4,753,855 A | 6/1988 | Haluska et al. |
| 4,756,977 A | 7/1988 | Haluska et al. |
| 4,762,767 A | 8/1988 | Haas et al. |
| 4,763,966 A | 8/1988 | Suzuki et al. |
| 4,767,571 A | 8/1988 | Suzuki et al. |
| 4,774,141 A | 9/1988 | Matsui et al. |
| 4,778,624 A | 10/1988 | Ohashi et al. |
| 4,782,009 A | 11/1988 | Bolon et al. |
| 4,783,347 A | 11/1988 | Doin et al. |
| 4,806,504 A | 2/1989 | Cleeves |
| 4,808,653 A | 2/1989 | Haluska et al. |
| 4,814,578 A | 3/1989 | Tuckerman |
| 4,816,049 A | 3/1989 | Hata et al. |
| 4,822,697 A | 4/1989 | Haluska et al. |
| 4,822,718 A | 4/1989 | Latham et al. |
| 4,826,943 A | 5/1989 | Ito et al. |
| 4,831,188 A | 5/1989 | Neckers |
| 4,839,274 A | 6/1989 | Logan |
| 4,847,152 A | 7/1989 | Jabs et al. |
| 4,847,162 A | 7/1989 | Haluska et al. |
| 4,849,296 A | 7/1989 | Haluska et al. |
| 4,855,199 A | 8/1989 | Bolon et al. |
| 4,863,827 A | 9/1989 | Jain et al. |
| 4,863,829 A | 9/1989 | Furuta et al. |
| 4,863,833 A | 9/1989 | Fukuyama et al. |
| 4,876,165 A | 10/1989 | Brewer et al. |
| 4,885,262 A | 12/1989 | Ting et al. |
| 4,895,914 A | 1/1990 | Saitoh et al. |
| 4,898,907 A | 2/1990 | Haluska et al. |
| 4,904,721 A | 2/1990 | Hanaoka et al. |
| 4,910,122 A | 3/1990 | Arnold et al. |
| 4,911,992 A | 3/1990 | Haluska et al. |
| 4,913,846 A | 4/1990 | Suzuki et al. |
| 4,921,317 A | 5/1990 | Suzuki et al. |
| 4,921,778 A | 5/1990 | Thackeray et al. |
| 4,923,638 A | 5/1990 | Ohno et al. |
| 4,925,772 A | 5/1990 | Quella et al. |
| 4,926,383 A | 5/1990 | Kertis et al. |
| 4,927,732 A | 5/1990 | Merrem et al. |
| 4,935,320 A | 6/1990 | Rohde et al. |
| 4,935,583 A | 6/1990 | Kyle |
| 4,940,651 A | 7/1990 | Brown et al. |
| 4,942,083 A | 7/1990 | Smith, Jr. |
| 4,943,511 A | 7/1990 | Lazarus et al. |
| 4,950,577 A | 8/1990 | Grieve et al. |
| 4,950,583 A | 8/1990 | Brewer et al. |
| 4,954,414 A | 9/1990 | Adair et al. |
| 4,962,996 A | 10/1990 | Cuellar et al. |
| 4,970,134 A | 11/1990 | Bronstert et al. |
| 4,973,510 A | 11/1990 | Tanaka |
| 4,973,526 A | 11/1990 | Haluska |
| 4,981,530 A | 1/1991 | Clodgo et al. |
| 4,981,778 A | 1/1991 | Brault |
| 4,988,514 A | 1/1991 | Fukuyama et al. |
| 4,999,397 A | 3/1991 | Weiss et al. |
| 5,004,660 A | 4/1991 | Van Andel et al. |
| 5,008,320 A | 4/1991 | Haluska et al. |
| 5,009,669 A | 4/1991 | Jollenbeck et al. |
| 5,009,809 A | 4/1991 | Kosin et al. |
| 5,009,810 A | 4/1991 | Wason et al. |
| 5,013,608 A | 5/1991 | Guest et al. |
| 5,024,923 A | 6/1991 | Suzuki et al. |
| 5,026,624 A | 6/1991 | Day et al. |
| 5,034,189 A | 7/1991 | Cox et al. |
| 5,037,580 A | 8/1991 | Garcia et al. |
| 5,043,789 A | 8/1991 | Linde et al. |
| 5,045,570 A | 9/1991 | Mooney et al. |
| 5,045,592 A | 9/1991 | Weiss et al. |
| 5,049,414 A | 9/1991 | Kato |
| 5,055,372 A | 10/1991 | Shanklin et al. |
| 5,055,376 A | 10/1991 | Saeva |
| 5,059,448 A | 10/1991 | Chandra et al. |
| 5,059,500 A | 10/1991 | Needham et al. |
| 5,063,134 A | 11/1991 | Horiguchi et al. |
| 5,063,267 A | 11/1991 | Hanneman et al. |
| 5,077,085 A | 12/1991 | Schnur et al. |
| 5,079,600 A | 1/1992 | Schnur et al. |
| 5,100,503 A | 3/1992 | Allman et al. |
| 5,102,695 A | 4/1992 | Guest et al. |
| 5,104,692 A | 4/1992 | Belmares |
| 5,106,534 A | 4/1992 | Wason et al. |
| 5,112,728 A | 5/1992 | Tanji et al. |
| 5,116,637 A | 5/1992 | Baney et al. |
| 5,116,715 A | 5/1992 | Roland et al. |
| 5,126,289 A | 6/1992 | Ziger |
| 5,137,655 A | 8/1992 | Kosin et al. |
| 5,140,396 A | 8/1992 | Needham et al. |
| 5,152,834 A | 10/1992 | Allman |
| 5,153,254 A | 10/1992 | Chen |
| 5,166,093 A | 11/1992 | Grief |
| 5,173,368 A | 12/1992 | Belmares |
| 5,179,185 A | 1/1993 | Yamamoto et al. |
| 5,194,364 A | 3/1993 | Abe et al. |
| 5,199,979 A | 4/1993 | Lin et al. |
| 5,212,046 A | 5/1993 | Lamola et al. |
| 5,212,218 A | 5/1993 | Rinehart |
| 5,219,788 A | 6/1993 | Abernathey et al. |
| 5,227,334 A | 7/1993 | Sandhu |
| 5,236,984 A | 8/1993 | Yamamoto et al. |
| 5,239,723 A | 8/1993 | Chen |
| 5,250,224 A | 10/1993 | Wason et al. |
| 5,252,340 A | 10/1993 | Honeycutt |
| 5,252,618 A | 10/1993 | Garcia et al. |
| 5,256,510 A | 10/1993 | Bugner et al. |
| 5,262,201 A | 11/1993 | Chandra et al. |
| 5,262,468 A | 11/1993 | Chen |
| 5,272,026 A | 12/1993 | Roland et al. |
| 5,272,042 A | 12/1993 | Allen et al. |
| 5,278,010 A | 1/1994 | Day et al. |
| 5,300,402 A | 4/1994 | Card, Jr. et al. |
| 5,302,198 A | 4/1994 | Allman |
| 5,302,455 A | 4/1994 | Wason et al. |
| 5,302,849 A | 4/1994 | Cavasin |
| 5,317,044 A | 5/1994 | Mooney et al. |
| 5,320,868 A | 6/1994 | Ballance et al. |
| 5,324,222 A | 6/1994 | Chen |
| 5,324,591 A | 6/1994 | Georger, Jr. et al. |
| 5,328,975 A | 7/1994 | Hanson et al. |
| 5,334,646 A | 8/1994 | Chen |
| 5,336,708 A | 8/1994 | Chen |
| 5,339,197 A | 8/1994 | Yen |
| 5,340,644 A | 8/1994 | Babcock et al. |
| 5,359,022 A | 10/1994 | Mautner et al. |

(56) References Cited

U.S. PATENT DOCUMENTS

| | | |
|---|---|---|
| 5,360,692 A | 11/1994 | Kawabe et al. |
| 5,380,621 A | 1/1995 | Dichiara et al. |
| 5,382,615 A | 1/1995 | Godfrey |
| 5,384,357 A | 1/1995 | Levinson et al. |
| 5,387,480 A | 2/1995 | Haluska et al. |
| 5,389,496 A | 2/1995 | Calvert et al. |
| 5,391,463 A | 2/1995 | Ligler et al. |
| 5,395,734 A | 3/1995 | Vogel et al. |
| 5,396,311 A | 3/1995 | Fukushima et al. |
| 5,401,614 A | 3/1995 | Dichiara et al. |
| 5,403,680 A | 4/1995 | Otagawa et al. |
| 5,414,069 A | 5/1995 | Cumming et al. |
| 5,417,977 A | 5/1995 | Honeycutt |
| 5,418,136 A | 5/1995 | Miller et al. |
| 5,432,007 A | 7/1995 | Naito |
| 5,439,766 A | 8/1995 | Day et al. |
| 5,439,872 A | 8/1995 | Ito et al. |
| 5,441,765 A | 8/1995 | Ballance et al. |
| 5,449,639 A | 9/1995 | Wei et al. |
| 5,449,712 A | 9/1995 | Gierke et al. |
| 5,455,145 A | 10/1995 | Tarumoto |
| 5,455,208 A | 10/1995 | Leung et al. |
| 5,457,081 A | 10/1995 | Takiguchi et al. |
| 5,458,982 A | 10/1995 | Godfrey |
| 5,467,626 A | 11/1995 | Sanders |
| 5,468,591 A | 11/1995 | Pearce et al. |
| 5,472,488 A | 12/1995 | Allman |
| 5,475,890 A | 12/1995 | Chen |
| 5,482,817 A | 1/1996 | Dichiara et al. |
| 5,498,345 A | 3/1996 | Jollenbeck et al. |
| 5,498,468 A | 3/1996 | Blaney |
| 5,498,748 A | 3/1996 | Urano et al. |
| 5,500,315 A | 3/1996 | Calvert et al. |
| 5,508,334 A | 4/1996 | Chen |
| 5,510,628 A | 4/1996 | Georger, Jr. et al. |
| 5,512,418 A | 4/1996 | Ma |
| 5,518,818 A | 5/1996 | Kidai et al. |
| 5,520,855 A | 5/1996 | Ito et al. |
| 5,523,163 A | 6/1996 | Ballance et al. |
| 5,527,562 A | 6/1996 | Balaba et al. |
| 5,527,872 A | 6/1996 | Allman |
| 5,546,017 A | 8/1996 | Vitunic |
| 5,552,260 A | 9/1996 | Vogel et al. |
| 5,554,485 A | 9/1996 | Dichiara et al. |
| 5,576,144 A | 11/1996 | Pearce et al. |
| 5,576,247 A | 11/1996 | Yano et al. |
| 5,576,359 A | 11/1996 | Urano et al. |
| 5,578,318 A | 11/1996 | Honeycutt |
| 5,580,606 A | 12/1996 | Kai |
| 5,580,819 A | 12/1996 | Li et al. |
| 5,583,195 A | 12/1996 | Eckberg |
| 5,597,408 A | 1/1997 | Choi |
| 5,624,294 A | 4/1997 | Chen |
| 5,629,437 A | 5/1997 | Linder et al. |
| 5,633,286 A | 5/1997 | Chen |
| 5,635,240 A | 6/1997 | Haluska et al. |
| 5,638,724 A | 6/1997 | Sanders |
| 5,648,201 A | 7/1997 | Dulcey et al. |
| 5,655,947 A | 8/1997 | Chen |
| 5,661,196 A | 8/1997 | Mayer et al. |
| 5,661,992 A | 9/1997 | Sanders |
| 5,662,109 A | 9/1997 | Hutson |
| 5,663,286 A | 9/1997 | Ahmed et al. |
| 5,665,845 A | 9/1997 | Allman |
| 5,670,295 A | 9/1997 | Namba et al. |
| 5,672,243 A | 9/1997 | Hsia et al. |
| 5,674,624 A | 10/1997 | Miyazaki et al. |
| 5,674,648 A | 10/1997 | Brewer et al. |
| 5,677,112 A | 10/1997 | Urano et al. |
| 5,679,128 A | 10/1997 | Latting et al. |
| 5,683,095 A | 11/1997 | Astier et al. |
| 5,693,691 A | 12/1997 | Flaim et al. |
| 5,693,701 A | 12/1997 | Camilletti et al. |
| 5,695,551 A | 12/1997 | Buckingham et al. |
| 5,695,910 A | 12/1997 | Urano et al. |
| 5,707,883 A | 1/1998 | Tabara |
| 5,719,249 A | 2/1998 | Fujita et al. |
| 5,729,563 A | 3/1998 | Wang et al. |
| 5,731,091 A | 3/1998 | Schmidt et al. |
| 5,741,623 A | 4/1998 | Namba et al. |
| 5,744,243 A | 4/1998 | Li et al. |
| 5,744,244 A | 4/1998 | Camilletti et al. |
| 5,747,223 A | 5/1998 | Allen et al. |
| 5,747,553 A | 5/1998 | Guzauskas |
| 5,750,292 A | 5/1998 | Sato et al. |
| 5,755,867 A | 5/1998 | Chikuni et al. |
| 5,756,257 A | 5/1998 | Landgrebe et al. |
| 5,759,625 A | 6/1998 | Laubacher et al. |
| 5,760,117 A | 6/1998 | Chen |
| 5,767,014 A | 6/1998 | Hawker et al. |
| 5,773,170 A | 6/1998 | Patel et al. |
| 5,776,559 A | 7/1998 | Woolford |
| 5,780,206 A | 7/1998 | Urano et al. |
| 5,786,125 A | 7/1998 | Tsuchiya et al. |
| 5,800,926 A | 9/1998 | Nogami et al. |
| 5,840,821 A | 11/1998 | Nakano et al. |
| 5,843,617 A | 12/1998 | Patel et al. |
| 5,851,730 A | 12/1998 | Thackeray et al. |
| 5,851,738 A | 12/1998 | Thackeray et al. |
| 5,853,808 A | 12/1998 | Arkles et al. |
| 5,855,960 A | 1/1999 | Ohnishi et al. |
| 5,858,547 A | 1/1999 | Drage |
| 5,868,597 A | 2/1999 | Chen |
| 5,873,931 A | 2/1999 | Scholz et al. |
| 5,877,228 A | 3/1999 | Mine et al. |
| 5,883,011 A | 3/1999 | Lin et al. |
| 5,884,639 A | 3/1999 | Chen |
| 5,905,109 A | 5/1999 | Shimizu et al. |
| 5,910,021 A | 6/1999 | Tabara |
| 5,922,299 A | 7/1999 | Bruinsma et al. |
| 5,929,159 A | 7/1999 | Schutt et al. |
| 5,935,758 A | 8/1999 | Patel et al. |
| 5,938,499 A | 8/1999 | Chen |
| 5,939,236 A | 8/1999 | Pavelchek et al. |
| 5,939,510 A | 8/1999 | Sato et al. |
| 5,944,431 A | 8/1999 | Becker et al. |
| 5,945,172 A | 8/1999 | Yamaya et al. |
| 5,945,249 A | 8/1999 | Patel et al. |
| 5,948,600 A | 9/1999 | Roschger et al. |
| 5,949,518 A | 9/1999 | Belmares et al. |
| 5,953,627 A | 9/1999 | Carter et al. |
| 5,962,067 A | 10/1999 | Bautista et al. |
| 5,962,572 A | 10/1999 | Chen |
| 5,964,917 A | 10/1999 | Latting |
| 5,965,305 A | 10/1999 | Ligler et al. |
| 5,972,616 A | 10/1999 | O'Brien et al. |
| 5,976,666 A | 11/1999 | Narang et al. |
| 5,981,675 A | 11/1999 | Valint, Jr. et al. |
| 5,985,444 A | 11/1999 | Olson et al. |
| 5,986,344 A | 11/1999 | Subramanion et al. |
| 5,994,431 A | 11/1999 | Olson et al. |
| 5,997,621 A | 12/1999 | Scholz et al. |
| 5,998,300 A | 12/1999 | Tabara |
| 5,998,522 A | 12/1999 | Nakano et al. |
| 6,008,350 A | 12/1999 | Roschger et al. |
| 6,020,410 A | 2/2000 | Hacker et al. |
| 6,022,812 A | 2/2000 | Smith et al. |
| 6,025,077 A | 2/2000 | Yamaki et al. |
| 6,033,283 A | 3/2000 | Chen |
| 6,037,275 A | 3/2000 | Wu et al. |
| 6,040,053 A | 3/2000 | Scholz et al. |
| 6,040,251 A | 3/2000 | Caldwell |
| 6,042,994 A | 3/2000 | Yang et al. |
| 6,043,547 A | 3/2000 | Hsia et al. |
| 6,048,804 A | 4/2000 | Smith et al. |
| 6,050,871 A | 4/2000 | Chen |
| 6,051,310 A | 4/2000 | Cano et al. |
| 6,057,239 A | 5/2000 | Wang et al. |
| 6,072,018 A | 6/2000 | Wilkes et al. |
| 6,074,695 A | 6/2000 | Kobayashi et al. |
| 6,087,068 A | 7/2000 | Sato et al. |
| 6,090,399 A | 7/2000 | Ghosh et al. |
| 6,090,448 A | 7/2000 | Wallace et al. |
| 6,096,460 A | 8/2000 | French et al. |

(56) References Cited

U.S. PATENT DOCUMENTS

| | | |
|---|---|---|
| 6,103,456 A | 8/2000 | Tobben et al. |
| 6,103,770 A | 8/2000 | Trouve |
| 6,103,779 A | 8/2000 | Guzauskas |
| 6,107,167 A | 8/2000 | Bhakta |
| 6,117,176 A | 9/2000 | Chen |
| 6,117,360 A | 9/2000 | Miyazawa et al. |
| 6,124,369 A | 9/2000 | Kudo et al. |
| 6,126,733 A | 10/2000 | Wallace et al. |
| 6,137,175 A | 10/2000 | Tabara |
| 6,140,254 A | 10/2000 | Endisch et al. |
| 6,143,855 A | 11/2000 | Hacker et al. |
| 6,144,083 A | 11/2000 | Yin |
| 6,147,407 A | 11/2000 | Jin et al. |
| 6,148,830 A | 11/2000 | Chen |
| 6,149,934 A | 11/2000 | Krzysik et al. |
| 6,149,966 A | 11/2000 | Kobayashi et al. |
| 6,150,250 A | 11/2000 | Tabara et al. |
| 6,150,440 A | 11/2000 | Olson et al. |
| 6,152,906 A | 11/2000 | Faulks et al. |
| 6,156,223 A | 12/2000 | Sigel et al. |
| 6,161,555 A | 12/2000 | Chen |
| 6,165,697 A | 12/2000 | Thackaray et al. |
| 6,166,163 A | 12/2000 | Kudo et al. |
| 6,171,766 B1 | 1/2001 | Patel et al. |
| 6,174,631 B1 | 1/2001 | French et al. |
| 6,174,977 B1 | 1/2001 | Ariyoshi et al. |
| 6,177,131 B1 | 1/2001 | Glaubitt et al. |
| 6,177,199 B1 | 1/2001 | Hacker et al. |
| 6,180,025 B1 | 1/2001 | Schoenfeld et al. |
| 6,180,317 B1 | 1/2001 | Allen et al. |
| 6,187,505 B1 | 2/2001 | Lin et al. |
| 6,187,689 B1 | 2/2001 | Tabara |
| 6,190,830 B1 | 2/2001 | Leon et al. |
| 6,190,839 B1 | 2/2001 | Pavelchek et al. |
| 6,190,955 B1 | 2/2001 | Ilg et al. |
| 6,191,030 B1 | 2/2001 | Subramanian et al. |
| 6,194,121 B1 | 2/2001 | Namba et al. |
| 6,194,534 B1 | 2/2001 | Baumann et al. |
| 6,204,202 B1 | 3/2001 | Leung et al. |
| 6,208,041 B1 | 3/2001 | Majumdar et al. |
| 6,210,862 B1 | 4/2001 | Day et al. |
| 6,214,104 B1 | 4/2001 | Iida et al. |
| 6,217,890 B1 | 4/2001 | Paul et al. |
| 6,218,020 B1 | 4/2001 | Hacker et al. |
| 6,218,497 B1 | 4/2001 | Hacker et al. |
| 6,225,033 B1 | 5/2001 | Onishi et al. |
| 6,225,671 B1 | 5/2001 | Yin |
| 6,231,989 B1 | 5/2001 | Chung et al. |
| 6,232,424 B1 | 5/2001 | Zhong et al. |
| 6,235,456 B1 | 5/2001 | Ibok |
| 6,238,379 B1 | 5/2001 | Keuhn, Jr. et al. |
| 6,238,838 B1 | 5/2001 | Gaschler et al. |
| 6,251,486 B1 | 6/2001 | Chandross et al. |
| 6,255,671 B1 | 7/2001 | Bojarczuk, Jr. et al. |
| 6,261,676 B1 | 7/2001 | Olson et al. |
| 6,261,743 B1 | 7/2001 | Pavelchek et al. |
| 6,268,108 B1 | 7/2001 | Iguchi et al. |
| 6,268,294 B1 | 7/2001 | Jang et al. |
| 6,268,457 B1 | 7/2001 | Kennedy et al. |
| 6,271,273 B1 | 8/2001 | You et al. |
| 6,277,750 B1 | 8/2001 | Pawlowski et al. |
| 6,280,911 B1 | 8/2001 | Trefonas, III |
| 6,284,428 B1 | 9/2001 | Hirosaki et al. |
| 6,287,286 B1 | 9/2001 | Akin et al. |
| 6,291,143 B1 | 9/2001 | Patel et al. |
| 6,291,586 B2 | 9/2001 | Lasch et al. |
| 6,296,862 B1 | 10/2001 | Paul et al. |
| 6,306,736 B1 | 10/2001 | Alivisatos et al. |
| 6,313,045 B1 | 11/2001 | Zhong et al. |
| 6,313,257 B1 | 11/2001 | Abbey |
| 6,315,946 B1 | 11/2001 | Focht |
| 6,316,013 B1 | 11/2001 | Paul et al. |
| 6,316,160 B1 | 11/2001 | Shao et al. |
| 6,316,165 B1 | 11/2001 | Pavelchek et al. |
| 6,318,124 B1 | 11/2001 | Rutherford et al. |
| 6,319,855 B1 | 11/2001 | Hendricks et al. |
| 6,323,268 B1 | 11/2001 | Fisher et al. |
| 6,324,703 B1 | 12/2001 | Chen |
| 6,326,231 B1 | 12/2001 | Subramanian et al. |
| 6,329,117 B1 | 12/2001 | Padmanaban et al. |
| 6,329,118 B1 | 12/2001 | Hussein et al. |
| 6,333,374 B1 | 12/2001 | Chen |
| 6,335,234 B2 | 1/2002 | Wu et al. |
| 6,335,235 B1 | 1/2002 | Bhakta et al. |
| 6,337,089 B1 | 1/2002 | Yoshioka et al. |
| 6,340,735 B1 | 1/2002 | Yagihashi |
| 6,342,249 B1 | 1/2002 | Wong et al. |
| 6,344,284 B1 | 2/2002 | Chou |
| 6,344,305 B1 | 2/2002 | Lin et al. |
| 6,348,240 B1 | 2/2002 | Calvert et al. |
| 6,350,818 B1 | 2/2002 | Hong et al. |
| 6,352,931 B1 | 3/2002 | Seta et al. |
| 6,358,294 B1 | 3/2002 | Latting |
| 6,358,559 B1 | 3/2002 | Hacker et al. |
| 6,359,096 B1 | 3/2002 | Zhong et al. |
| 6,359,099 B1 | 3/2002 | Hacker et al. |
| 6,361,820 B1 | 3/2002 | Hacker et al. |
| 6,365,266 B1 | 4/2002 | MacDougall et al. |
| 6,365,529 B1 | 4/2002 | Hussein et al. |
| 6,365,765 B1 | 4/2002 | Baldwin et al. |
| 6,368,400 B1 | 4/2002 | Baldwin et al. |
| 6,368,681 B1 | 4/2002 | Ogawa |
| 6,374,738 B1 | 4/2002 | Lewis et al. |
| 6,380,621 B1 | 4/2002 | Ando et al. |
| 6,383,466 B1 | 5/2002 | Domansky et al. |
| 6,387,519 B1 | 5/2002 | Anderson et al. |
| 6,391,524 B2 | 5/2002 | Yates et al. |
| 6,399,269 B2 | 6/2002 | Mizutani et al. |
| 6,403,464 B1 | 6/2002 | Chang |
| 6,409,883 B1 | 6/2002 | Makolin et al. |
| 6,410,150 B1 | 6/2002 | Kurosawa et al. |
| 6,410,209 B1 | 6/2002 | Adams et al. |
| 6,413,647 B1 | 7/2002 | Hayashi et al. |
| 6,420,088 B1 | 7/2002 | Angelopoulos et al. |
| 6,420,475 B1 | 7/2002 | Chen |
| 6,426,125 B1 | 7/2002 | Yang et al. |
| 6,426,371 B1 | 7/2002 | Li et al. |
| 6,432,191 B2 | 8/2002 | Schutt |
| 6,433,037 B1 | 8/2002 | Guzauskas |
| 6,441,452 B2 | 8/2002 | Yin |
| 6,444,584 B1 | 9/2002 | Hsiao |
| 6,448,185 B1 | 9/2002 | Andideh et al. |
| 6,448,331 B1 | 9/2002 | Ioka et al. |
| 6,448,464 B1 | 9/2002 | Akin et al. |
| 6,451,503 B1 | 9/2002 | Thackeray et al. |
| 6,455,207 B1 | 9/2002 | Katoh et al. |
| 6,455,416 B1 | 9/2002 | Subramanian et al. |
| 6,456,358 B1 | 9/2002 | Lu |
| 6,461,970 B1 | 10/2002 | Yin |
| 6,465,358 B1 | 10/2002 | Nashner et al. |
| 6,465,889 B1 | 10/2002 | Subramanian et al. |
| 6,472,012 B2 | 10/2002 | Nakada et al. |
| 6,472,128 B2 | 10/2002 | Thackeray et al. |
| 6,475,892 B1 | 11/2002 | Bhakta |
| 6,485,368 B2 | 11/2002 | Jones et al. |
| 6,488,394 B1 | 12/2002 | Mabe et al. |
| 6,491,840 B1 | 12/2002 | Frankenbach et al. |
| 6,492,441 B2 | 12/2002 | Hong et al. |
| 6,495,264 B2 | 12/2002 | Hayashi et al. |
| 6,495,479 B1 | 12/2002 | Wu et al. |
| 6,497,893 B1 | 12/2002 | Everhart et al. |
| 6,503,233 B1 | 1/2003 | Chen et al. |
| 6,503,413 B2 | 1/2003 | Uchiyama et al. |
| 6,503,525 B1 | 1/2003 | Mayberry et al. |
| 6,503,526 B1 | 1/2003 | Krzysik et al. |
| 6,503,586 B1 | 1/2003 | Wu et al. |
| 6,503,692 B2 | 1/2003 | Angelopoulos et al. |
| 6,503,850 B1 | 1/2003 | Wallace et al. |
| 6,504,525 B1 | 1/2003 | Knights |
| 6,505,362 B1 | 1/2003 | Scipio |
| 6,506,497 B1 | 1/2003 | Kennedy et al. |
| 6,509,279 B2 | 1/2003 | Fujii et al. |
| 6,512,071 B1 | 1/2003 | Hacker et al. |
| 6,514,677 B1 | 2/2003 | Ramsden et al. |

(56) References Cited

U.S. PATENT DOCUMENTS

| | | |
|---|---|---|
| 6,515,073 B2 | 2/2003 | Sakamoto et al. |
| 6,517,951 B2 | 2/2003 | Hacker et al. |
| 6,528,235 B2 | 3/2003 | Thackeray et al. |
| 6,540,884 B1 | 4/2003 | Siddle et al. |
| 6,541,107 B1 | 4/2003 | Zhong et al. |
| 6,544,717 B2 | 4/2003 | Hirosaki et al. |
| 6,548,113 B1 | 4/2003 | Birnbaum et al. |
| 6,552,109 B1 | 4/2003 | Chen |
| 6,558,363 B2 | 5/2003 | McDowall et al. |
| 6,558,880 B1 | 5/2003 | Goswami et al. |
| 6,562,192 B1 | 5/2003 | Hamilton et al. |
| 6,565,767 B2 | 5/2003 | Hattori et al. |
| 6,565,813 B1 | 5/2003 | Garyantes |
| 6,566,479 B1 | 5/2003 | Bublewitz et al. |
| 6,573,175 B1 | 6/2003 | Yin et al. |
| 6,576,382 B2 | 6/2003 | Day et al. |
| 6,576,408 B2 | 6/2003 | Meador et al. |
| 6,576,651 B2 | 6/2003 | Bandyopadhyay et al. |
| 6,582,861 B2 | 6/2003 | Buxbaum et al. |
| 6,586,102 B1 | 7/2003 | Stachowiak |
| 6,589,658 B1 | 7/2003 | Stachowiak |
| 6,592,980 B1 | 7/2003 | MacDougall et al. |
| 6,592,999 B1 | 7/2003 | Anderson et al. |
| 6,593,388 B2 | 7/2003 | Crivello |
| 6,596,314 B2 | 7/2003 | Wong et al. |
| 6,596,404 B1 | 7/2003 | Albaugh et al. |
| 6,596,467 B2 | 7/2003 | Gallagher et al. |
| 6,602,652 B2 | 8/2003 | Adams et al. |
| 6,605,359 B2 | 8/2003 | Robinson et al. |
| 6,605,360 B2 | 8/2003 | Kizaki et al. |
| 6,605,362 B2 | 8/2003 | Baldwin et al. |
| 6,605,542 B2 | 8/2003 | Seta et al. |
| 6,607,991 B1 | 8/2003 | Livesay et al. |
| 6,610,457 B2 | 8/2003 | Kim et al. |
| 6,612,828 B2 | 9/2003 | Powers et al. |
| 6,613,834 B2 | 9/2003 | Nakata et al. |
| 6,617,257 B2 | 9/2003 | Ni et al. |
| 6,617,609 B2 | 9/2003 | Kelley et al. |
| 6,623,791 B2 | 9/2003 | Sadvary et al. |
| 6,627,275 B1 | 9/2003 | Chen |
| 6,632,535 B2 | 10/2003 | Buazza et al. |
| 6,635,281 B2 | 10/2003 | Wong et al. |
| 6,635,341 B1 | 10/2003 | Barancyk et al. |
| 6,645,685 B2 | 11/2003 | Takata et al. |
| 6,645,881 B2 | 11/2003 | Yamada et al. |
| 6,649,212 B2 | 11/2003 | Payne et al. |
| 6,649,266 B1 | 11/2003 | Gross et al. |
| 6,649,534 B2 | 11/2003 | Fujii et al. |
| 6,649,741 B1 | 11/2003 | O'Brien et al. |
| 6,652,766 B1 | 11/2003 | Frankenbach et al. |
| 6,653,049 B2 | 11/2003 | Pavelchek et al. |
| 6,655,946 B2 | 12/2003 | Foreman et al. |
| 6,664,199 B2 | 12/2003 | Fujii et al. |
| 6,667,424 B1 | 12/2003 | Hamilton et al. |
| 6,670,284 B2 | 12/2003 | Yin |
| 6,673,982 B1 | 1/2004 | Chen et al. |
| 6,674,106 B2 | 1/2004 | Tanaka et al. |
| 6,676,398 B2 | 1/2004 | Foreman et al. |
| 6,676,740 B2 | 1/2004 | Matsumura et al. |
| 6,677,392 B2 | 1/2004 | Ravichandran et al. |
| 6,689,932 B2 | 2/2004 | Kruchoski et al. |
| 6,696,538 B2 | 2/2004 | Ko et al. |
| 6,699,647 B2 | 3/2004 | Lynch et al. |
| 6,702,564 B2 | 3/2004 | Foreman et al. |
| 6,703,169 B2 | 3/2004 | Fuller et al. |
| 6,703,462 B2 | 3/2004 | Lee |
| 6,709,257 B2 | 3/2004 | Foreman et al. |
| 6,712,331 B2 | 3/2004 | Foreman et al. |
| 6,716,566 B2 | 4/2004 | Aoshima |
| 6,717,181 B2 | 4/2004 | Murakami et al. |
| 6,720,125 B2 | 4/2004 | Nakamura |
| 6,726,463 B2 | 4/2004 | Foreman |
| 6,730,454 B2 | 5/2004 | Pfeiffer et al. |
| 6,730,461 B2 | 5/2004 | Hunt et al. |
| 6,737,121 B2 | 5/2004 | Yang et al. |
| 6,740,685 B2 | 5/2004 | Li et al. |
| 6,749,860 B2 | 6/2004 | Tyrrell et al. |
| 6,752,613 B2 | 6/2004 | Foreman |
| 6,756,103 B2 | 6/2004 | Thompson et al. |
| 6,756,124 B2 | 6/2004 | Kanamori et al. |
| 6,756,520 B1 | 6/2004 | Krzysik et al. |
| 6,758,663 B2 | 7/2004 | Foreman et al. |
| 6,767,689 B2 | 7/2004 | Pavelchek et al. |
| 6,770,726 B1 | 8/2004 | Arkles et al. |
| 6,773,861 B2 | 8/2004 | Takashima et al. |
| 6,773,864 B1 | 8/2004 | Thackeray et al. |
| 6,776,094 B1 | 8/2004 | Whitesides et al. |
| 6,777,092 B1 | 8/2004 | Hayashi et al. |
| 6,780,498 B2 | 8/2004 | Nakata et al. |
| 6,783,468 B2 | 8/2004 | Sullivan et al. |
| 6,787,281 B2 | 9/2004 | Tao et al. |
| 6,790,024 B2 | 9/2004 | Foreman |
| 6,794,440 B2 | 9/2004 | Chen |
| 6,797,343 B2 | 9/2004 | Lee |
| 6,800,330 B2 | 10/2004 | Hayashi et al. |
| 6,803,034 B2 | 10/2004 | DuVal et al. |
| 6,803,168 B1 | 10/2004 | Padmanaban et al. |
| 6,803,476 B2 | 10/2004 | Rantala et al. |
| 6,808,381 B2 | 10/2004 | Foreman et al. |
| 6,818,289 B2 | 11/2004 | MacDougall et al. |
| 6,819,049 B1 | 11/2004 | Bohmer |
| 6,824,879 B2 | 11/2004 | Baldwin et al. |
| 6,824,952 B1 | 11/2004 | Minsek et al. |
| 6,825,303 B2 | 11/2004 | Lee |
| 6,831,189 B2 | 12/2004 | Rantala et al. |
| 6,832,064 B2 | 12/2004 | Simpson et al. |
| 6,838,178 B1 | 1/2005 | Strickler et al. |
| 6,840,752 B2 | 1/2005 | Foreman et al. |
| 6,844,131 B2 | 1/2005 | Oberlander et al. |
| 6,846,614 B2 | 1/2005 | Timpe et al. |
| 6,849,209 B2 | 2/2005 | Minami et al. |
| 6,849,373 B2 | 2/2005 | Pavelchek et al. |
| 6,849,923 B2 | 2/2005 | Seta et al. |
| 6,852,421 B2 | 2/2005 | Wayton et al. |
| 6,852,766 B1 | 2/2005 | DeVoe |
| 6,855,466 B2 | 2/2005 | Pavelchek et al. |
| 6,864,040 B2 | 3/2005 | Muller et al. |
| 6,867,253 B1 | 3/2005 | Chen |
| 6,869,747 B2 | 3/2005 | Sabnis et al. |
| 6,875,005 B2 | 4/2005 | Foreman |
| 6,875,262 B1 | 4/2005 | Shibuya et al. |
| 6,884,568 B2 | 4/2005 | Timpe et al. |
| 6,887,644 B1 | 5/2005 | Nozaki et al. |
| 6,887,648 B2 | 5/2005 | Pavelchek et al. |
| 6,888,174 B2 | 5/2005 | Hohn et al. |
| 6,890,448 B2 | 5/2005 | Pavelchek |
| 6,890,605 B2 | 5/2005 | Nishikawa et al. |
| 6,890,855 B2 | 5/2005 | Cotte et al. |
| 6,890,865 B2 | 5/2005 | Yin et al. |
| 6,891,237 B1 | 5/2005 | Bao et al. |
| 6,893,245 B2 | 5/2005 | Foreman et al. |
| 6,893,797 B2 | 5/2005 | Munnelly et al. |
| 6,896,821 B2 | 5/2005 | Louellet |
| 6,896,955 B2 | 5/2005 | Mandal et al. |
| 6,899,988 B2 | 5/2005 | Kidnie et al. |
| 6,900,000 B2 | 5/2005 | Sabnis et al. |
| 6,902,771 B2 | 6/2005 | Shiota et al. |
| 6,902,861 B2 | 6/2005 | Tao et al. |
| 6,908,722 B2 | 6/2005 | Ebata et al. |
| 6,909,220 B2 | 6/2005 | Chen |
| 6,911,514 B2 | 6/2005 | Bublewitz et al. |
| 6,914,114 B2 | 7/2005 | Baldwin et al. |
| 6,921,578 B2 | 7/2005 | Tsujino et al. |
| 6,924,384 B2 | 8/2005 | Rantala et al. |
| 6,942,083 B2 | 9/2005 | Barnes et al. |
| 6,942,918 B2 | 9/2005 | MacDougall et al. |
| 6,956,097 B2 | 10/2005 | Kennedy et al. |
| 6,969,753 B2 | 11/2005 | Baldwin et al. |
| 6,974,970 B2 | 12/2005 | Rantala et al. |
| 7,011,889 B2 | 3/2006 | Bedwell et al. |
| 7,012,125 B2 | 3/2006 | Kennedy et al. |
| 7,014,982 B2 | 3/2006 | Thackeray et al. |
| 7,015,061 B2 | 3/2006 | Lu et al. |
| 7,026,053 B2 | 4/2006 | Shiota et al. |

(56) References Cited

U.S. PATENT DOCUMENTS

| | | |
|---|---|---|
| 7,060,634 B2 | 6/2006 | Rantala et al. |
| 7,074,874 B2 | 7/2006 | Kobayashi et al. |
| 7,081,272 B2 | 7/2006 | Sasaki et al. |
| 7,098,346 B2 | 8/2006 | Rantala et al. |
| 7,109,519 B2 | 9/2006 | Gerlach |
| 7,119,354 B2 | 10/2006 | Yagihashi et al. |
| 7,128,944 B2 | 10/2006 | Becker et al. |
| 7,128,976 B2 | 10/2006 | Hayashi et al. |
| 7,132,473 B2 | 11/2006 | Ogihara et al. |
| 7,135,064 B2 | 11/2006 | Shibuya et al. |
| 7,144,827 B2 | 12/2006 | Rantala et al. |
| 7,161,019 B2 | 1/2007 | Rantala et al. |
| 7,172,913 B2 | 2/2007 | Lee et al. |
| 7,173,371 B2 | 2/2007 | Pang et al. |
| 7,173,372 B2 | 2/2007 | Koo et al. |
| 7,176,493 B2 | 2/2007 | So et al. |
| 7,176,535 B2 | 2/2007 | Chae |
| 7,176,994 B2 | 2/2007 | Maeda et al. |
| 7,177,000 B2 | 2/2007 | Hu et al. |
| 7,179,673 B2 | 2/2007 | Song et al. |
| 7,180,090 B2 | 2/2007 | Chen et al. |
| 7,180,198 B2 | 2/2007 | Kim |
| 7,180,559 B2 | 2/2007 | Chang et al. |
| 7,180,563 B2 | 2/2007 | Kim |
| 7,180,565 B2 | 2/2007 | Hong et al. |
| 7,198,823 B2 | 4/2007 | Lee et al. |
| 7,244,960 B2 | 7/2007 | Spreitzer et al. |
| 7,297,464 B2 | 11/2007 | Sakurai et al. |
| 7,374,812 B2 | 5/2008 | Mizuno |
| 7,445,953 B2 | 11/2008 | Lu et al. |
| 7,575,809 B2 | 8/2009 | Glaubitt et al. |
| 7,678,462 B2 | 3/2010 | Kennedy et al. |
| 7,767,253 B2 | 8/2010 | Sharma |
| 2001/0024685 A1 | 9/2001 | Boulton et al. |
| 2001/0039322 A1 | 11/2001 | Hattori et al. |
| 2002/0020327 A1 | 2/2002 | Hayashi et al. |
| 2002/0031729 A1 | 3/2002 | Trefonas, III et al. |
| 2002/0034626 A1 | 3/2002 | Liu |
| 2002/0034630 A1 | 3/2002 | Cano et al. |
| 2002/0068181 A1 | 6/2002 | Baldwin et al. |
| 2002/0074625 A1 | 6/2002 | Wang et al. |
| 2002/0090519 A1 | 7/2002 | Kursawe et al. |
| 2002/0095018 A1 | 7/2002 | Baldwin et al. |
| 2002/0102396 A1 | 8/2002 | MacDougall |
| 2002/0102417 A1 | 8/2002 | Schutt et al. |
| 2002/0123592 A1 | 9/2002 | Zhang et al. |
| 2002/0127330 A1 | 9/2002 | Jin et al. |
| 2002/0128388 A1 | 9/2002 | Kennedy et al. |
| 2002/0169269 A1 | 11/2002 | Hwang et al. |
| 2002/0192981 A1 | 12/2002 | Fujii et al. |
| 2003/0003176 A1 | 1/2003 | Foreman et al. |
| 2003/0091838 A1 | 5/2003 | Hayashi et al. |
| 2003/0104225 A1 | 6/2003 | Shiota et al. |
| 2003/0105246 A1 | 6/2003 | Andoh et al. |
| 2003/0111748 A1 | 6/2003 | Foreman |
| 2003/0120018 A1 | 6/2003 | Baldwin et al. |
| 2003/0125430 A1 | 7/2003 | Adedeji et al. |
| 2003/0157311 A1 | 8/2003 | MacDougall |
| 2003/0157340 A1 | 8/2003 | Shiota et al. |
| 2003/0157391 A1 | 8/2003 | Coleman et al. |
| 2003/0171729 A1 | 9/2003 | Kaun et al. |
| 2003/0191269 A1 | 10/2003 | Ko et al. |
| 2003/0192638 A1 | 10/2003 | Yang et al. |
| 2003/0193624 A1 | 10/2003 | Kobayashi et al. |
| 2003/0198578 A1 | 10/2003 | Lee et al. |
| 2003/0199633 A1 | 10/2003 | Leon et al. |
| 2003/0224611 A1 | 12/2003 | Seta et al. |
| 2003/0227021 A1 | 12/2003 | Yamazaki et al. |
| 2004/0020689 A1 | 2/2004 | Kagami et al. |
| 2004/0028915 A1 | 2/2004 | Shibuya et al. |
| 2004/0028918 A1 | 2/2004 | Becker et al. |
| 2004/0067436 A1 | 4/2004 | Kinsho et al. |
| 2004/0067437 A1 | 4/2004 | Wayton et al. |
| 2004/0072420 A1 | 4/2004 | Enomoto et al. |
| 2004/0072436 A1 | 4/2004 | Ramachandra Rao et al. |
| 2004/0077757 A1 | 4/2004 | Araki et al. |
| 2004/0087184 A1 | 5/2004 | Mandal et al. |
| 2004/0089238 A1 | 5/2004 | Birnbaum |
| 2004/0091811 A1 | 5/2004 | Munnelly et al. |
| 2004/0096666 A1 | 5/2004 | Knox et al. |
| 2004/0122197 A1 | 6/2004 | Putzer |
| 2004/0131979 A1 | 7/2004 | Li et al. |
| 2004/0166434 A1 | 8/2004 | Dammel et al. |
| 2004/0180223 A1 | 9/2004 | Shibuya et al. |
| 2004/0201007 A1 | 10/2004 | Yagihashi et al. |
| 2004/0219372 A1 | 11/2004 | Ogihara et al. |
| 2004/0229158 A1 | 11/2004 | Meador et al. |
| 2004/0247900 A1 | 12/2004 | Ogihara et al. |
| 2004/0253461 A1 | 12/2004 | Ogihara et al. |
| 2004/0253532 A1 | 12/2004 | Wu et al. |
| 2004/0253535 A1 | 12/2004 | Cameron et al. |
| 2004/0258929 A1 | 12/2004 | Glaubitt et al. |
| 2005/0003681 A1 | 1/2005 | Lyu |
| 2005/0019842 A1 | 1/2005 | Prober et al. |
| 2005/0020837 A1 | 1/2005 | Doherty et al. |
| 2005/0026092 A1 | 2/2005 | Nagase |
| 2005/0031791 A1 | 2/2005 | Sasaki et al. |
| 2005/0032357 A1 | 2/2005 | Rantala et al. |
| 2005/0042538 A1 | 2/2005 | Babich et al. |
| 2005/0058929 A1 | 3/2005 | Kennedy et al. |
| 2005/0064726 A1 | 3/2005 | Reid et al. |
| 2005/0074689 A1 | 4/2005 | Angelopoulos et al. |
| 2005/0074981 A1 | 4/2005 | Meagley et al. |
| 2005/0077639 A1 | 4/2005 | Foreman et al. |
| 2005/0080214 A1 | 4/2005 | Shin et al. |
| 2005/0090570 A1 | 4/2005 | Lyu |
| 2005/0092206 A1 | 5/2005 | Sakamoto |
| 2005/0096408 A1 | 5/2005 | Wakamura |
| 2005/0106376 A1 | 5/2005 | Leung et al. |
| 2005/0119394 A1 | 6/2005 | Sakurai |
| 2005/0136268 A1 | 6/2005 | Shin et al. |
| 2005/0136687 A1 | 6/2005 | Lu et al. |
| 2005/0171277 A1 | 8/2005 | Li et al. |
| 2005/0221225 A1 | 10/2005 | Kawana |
| 2005/0234167 A1 | 10/2005 | Bae et al. |
| 2005/0245717 A1 | 11/2005 | Kennedy et al. |
| 2005/0255326 A1 | 11/2005 | Sakurai et al. |
| 2005/0267277 A1 | 12/2005 | Takahama et al. |
| 2006/0027803 A1 | 2/2006 | Lu et al. |
| 2006/0046079 A1 | 3/2006 | Lee et al. |
| 2006/0047034 A1 | 3/2006 | Sakurai |
| 2006/0052566 A1 | 3/2006 | Sakurai et al. |
| 2006/0057801 A1 | 3/2006 | Rantala et al. |
| 2006/0110682 A1 | 5/2006 | Thackeray et al. |
| 2006/0127587 A1 | 6/2006 | Kang et al. |
| 2006/0131753 A1 | 6/2006 | Rantala et al. |
| 2006/0132459 A1 | 6/2006 | Huddleston et al. |
| 2006/0134441 A1 | 6/2006 | Mah et al. |
| 2006/0141163 A1 | 6/2006 | Choi |
| 2006/0141641 A1 | 6/2006 | Fan et al. |
| 2006/0147723 A1 | 7/2006 | Jing et al. |
| 2006/0147724 A1 | 7/2006 | Mizuno |
| 2006/0155594 A1 | 7/2006 | Almeida et al. |
| 2006/0159938 A1 | 7/2006 | Lee et al. |
| 2006/0205236 A1 | 9/2006 | Li et al. |
| 2006/0258146 A1 | 11/2006 | Rantala et al. |
| 2006/0264595 A1 | 11/2006 | Lyu |
| 2006/0286813 A1 | 12/2006 | Meredith et al. |
| 2006/0289849 A1 | 12/2006 | Yagihashi et al. |
| 2007/0004587 A1 | 1/2007 | Chebiam et al. |
| 2007/0018926 A1 | 1/2007 | Shin et al. |
| 2007/0020899 A1 | 1/2007 | Hirai et al. |
| 2007/0021025 A1 | 1/2007 | Kim et al. |
| 2007/0022909 A1 | 2/2007 | Kennedy et al. |
| 2007/0023837 A1 | 2/2007 | Lee et al. |
| 2007/0023864 A1 | 2/2007 | Khater |
| 2007/0024181 A1 | 2/2007 | Oh |
| 2007/0024766 A1 | 2/2007 | Song et al. |
| 2007/0024770 A1 | 2/2007 | Jang |
| 2007/0024775 A1 | 2/2007 | Lee |
| 2007/0024783 A1 | 2/2007 | Joo |
| 2007/0024788 A1 | 2/2007 | Kamiya |
| 2007/0024790 A1 | 2/2007 | Chang |
| 2007/0026104 A1 | 2/2007 | Nakano |

(56) References Cited

U.S. PATENT DOCUMENTS

| | | | |
|---|---|---|---|
| 2007/0029547 A1 | 2/2007 | Parker |
| 2007/0030407 A1 | 2/2007 | Kwak et al. |
| 2007/0030428 A1 | 2/2007 | Lu et al. |
| 2007/0030431 A1 | 2/2007 | Lee et al. |
| 2007/0030434 A1 | 2/2007 | Hirabayashi et al. |
| 2007/0030437 A1 | 2/2007 | Kim |
| 2007/0034879 A1 | 2/2007 | Park |
| 2007/0035225 A1 | 2/2007 | Lee et al. |
| 2007/0035673 A1 | 2/2007 | Sakurai et al. |
| 2007/0035675 A1 | 2/2007 | Um et al. |
| 2007/0074757 A1 | 4/2007 | Mellott et al. |
| 2007/0088144 A1 | 4/2007 | Kang et al. |
| 2007/0111014 A1 | 5/2007 | Katsoulis et al. |
| 2007/0116966 A1 | 5/2007 | Mellott et al. |
| 2007/0206283 A1 | 9/2007 | Ohtani et al. |
| 2008/0032052 A1 | 2/2008 | Kourtakis et al. |
| 2008/0157065 A1 | 7/2008 | Krishnamoorthy et al. |
| 2008/0185041 A1 | 8/2008 | Sharma et al. |
| 2008/0206578 A1* | 8/2008 | Rantala et al. ............... 428/447 |
| 2008/0206690 A1 | 8/2008 | Kennedy et al. |
| 2008/0248280 A1 | 10/2008 | Hamada et al. |
| 2008/0290472 A1 | 11/2008 | Yagihashi et al. |
| 2008/0295884 A1 | 12/2008 | Sharma et al. |
| 2008/0299400 A1 | 12/2008 | Furuya et al. |
| 2009/0004606 A1 | 1/2009 | Albaugh et al. |
| 2009/0026924 A1 | 1/2009 | Leung et al. |
| 2009/0029145 A1 | 1/2009 | Thies et al. |
| 2009/0043004 A1 | 2/2009 | Moszner et al. |
| 2009/0068377 A1 | 3/2009 | Kuki |
| 2009/0087665 A1 | 4/2009 | Suzuki et al. |
| 2009/0101203 A1 | 4/2009 | Sharma |
| 2009/0101209 A1 | 4/2009 | Sharma et al. |
| 2009/0244709 A1 | 10/2009 | Suzuki et al. |
| 2009/0275694 A1 | 11/2009 | Baldwin-Hendricks et al. |
| 2010/0027144 A1 | 2/2010 | Varaprasad et al. |
| 2010/0092763 A1 | 4/2010 | Kleiman-Shwarsctein et al. |
| 2010/0252917 A1 | 10/2010 | Karkkainen |
| 2010/0313950 A1 | 12/2010 | Mukhopadhyay et al. |
| 2010/0321762 A1 | 12/2010 | Shibata et al. |
| 2012/0129352 A1* | 5/2012 | Mori et al. ............... 438/703 |

FOREIGN PATENT DOCUMENTS

| | | |
|---|---|---|
| EP | 0423446 | 4/1991 |
| EP | 0427395 | 5/1991 |
| EP | 0449263 | 10/1991 |
| EP | 0217137 | 4/1992 |
| EP | 0494744 | 7/1992 |
| EP | 0159428 | 11/1992 |
| EP | 0204963 | 1/1993 |
| EP | 0388503 | 9/1993 |
| EP | 0458651 | 3/1994 |
| EP | 0225676 | 7/1994 |
| EP | 0401499 | 12/1995 |
| EP | 0422570 | 12/1995 |
| EP | 0727711 | 8/1996 |
| EP | 0659904 B1 | 7/1998 |
| EP | 0851300 | 7/1998 |
| EP | 0881678 | 12/1998 |
| EP | 0902067 | 3/1999 |
| EP | 0911875 | 4/1999 |
| EP | 1142832 | 4/2000 |
| EP | 1046689 | 10/2000 |
| EP | 0687004 | 12/2002 |
| EP | 1296365 | 3/2003 |
| EP | 1376671 | 1/2004 |
| EP | 1659423 | 5/2006 |
| EP | 1674904 | 6/2006 |
| EP | 1829945 | 9/2007 |
| GB | 1385241 | 2/1975 |
| GB | 1601288 | 10/1981 |
| GB | 2424382 | 9/2006 |
| JP | 53124561 | 10/1978 |
| JP | 55-063335 | 5/1980 |
| JP | 55165942 | 12/1980 |
| JP | 56000627 | 1/1981 |
| JP | 56000828 | 1/1981 |
| JP | 81028935 | 7/1981 |
| JP | 56118465 | 9/1981 |
| JP | 56129261 | 10/1981 |
| JP | 56139533 | 10/1981 |
| JP | 56151731 | 11/1981 |
| JP | 57008279 | 1/1982 |
| JP | 57038865 | 3/1982 |
| JP | 57083563 | 5/1982 |
| JP | 57112047 | 7/1982 |
| JP | 57125905 | 8/1982 |
| JP | 57131250 | 8/1982 |
| JP | 57141641 | 9/1982 |
| JP | 57141642 | 9/1982 |
| JP | 57168246 | 10/1982 |
| JP | 57168247 | 10/1982 |
| JP | 58-003249 | 1/1983 |
| JP | 83007001 | 2/1983 |
| JP | 58-066335 | 4/1983 |
| JP | 58174480 | 10/1983 |
| JP | 59109565 | 6/1984 |
| JP | 59112487 | 6/1984 |
| JP | 59112834 | 6/1984 |
| JP | 59132423 | 7/1984 |
| JP | 59189126 | 10/1984 |
| JP | 59190211 | 10/1984 |
| JP | 60042426 | 3/1985 |
| JP | 60076528 | 5/1985 |
| JP | 60086017 | 5/1985 |
| JP | 60116132 | 6/1985 |
| JP | 60152552 | 8/1985 |
| JP | 60195148 | 10/1985 |
| JP | 60254034 | 12/1985 |
| JP | 60254035 | 12/1985 |
| JP | 61014096 | 1/1986 |
| JP | 61020024 | 1/1986 |
| JP | 61098747 | 5/1986 |
| JP | 61108628 | 5/1986 |
| JP | 61127732 | 6/1986 |
| JP | 61221232 | 10/1986 |
| JP | 61224330 | 10/1986 |
| JP | 61256347 | 11/1986 |
| JP | 61260242 | 11/1986 |
| JP | 61274497 | 12/1986 |
| JP | 62027417 | 2/1987 |
| JP | 62043426 | 2/1987 |
| JP | 62056956 | 3/1987 |
| JP | 62067561 | 3/1987 |
| JP | 62096942 | 5/1987 |
| JP | 62161124 | 7/1987 |
| JP | 62215944 | 9/1987 |
| JP | 62276543 | 12/1987 |
| JP | 62299965 | 12/1987 |
| JP | 63005337 | 1/1988 |
| JP | 63006544 | 1/1988 |
| JP | 63046272 | 2/1988 |
| JP | 63072745 | 4/1988 |
| JP | 63106649 | 5/1988 |
| JP | 63117074 | 5/1988 |
| JP | 63118739 | 5/1988 |
| JP | 63120774 | 5/1988 |
| JP | 63137437 | 6/1988 |
| JP | 63137972 | 6/1988 |
| JP | 63149636 | 6/1988 |
| JP | 63152130 | 6/1988 |
| JP | 63172757 | 7/1988 |
| JP | 63199251 | 8/1988 |
| JP | 63207829 | 8/1988 |
| JP | 63218947 | 9/1988 |
| JP | 63218948 | 9/1988 |
| JP | 63238133 | 10/1988 |
| JP | 63287823 | 11/1988 |
| JP | 63289045 | 11/1988 |
| JP | 63308077 | 12/1988 |
| JP | 63312643 | 12/1988 |
| JP | 1016868 | 1/1989 |
| JP | 64001769 | 1/1989 |

(56) References Cited

FOREIGN PATENT DOCUMENTS

| | | |
|---|---|---|
| JP | 1038256 | 2/1989 |
| JP | 1056710 | 3/1989 |
| JP | 1076046 | 3/1989 |
| JP | 1110546 | 4/1989 |
| JP | 1115966 | 5/1989 |
| JP | 1168718 | 7/1989 |
| JP | 1185367 | 7/1989 |
| JP | 1203013 | 8/1989 |
| JP | 1204043 | 8/1989 |
| JP | 1204432 | 8/1989 |
| JP | 1207310 | 8/1989 |
| JP | 1217352 | 8/1989 |
| JP | 1245248 | 9/1989 |
| JP | 1308429 | 12/1989 |
| JP | 1313942 | 12/1989 |
| JP | 2000615 | 1/1990 |
| JP | 2008209 | 1/1990 |
| JP | 2038427 | 2/1990 |
| JP | 2099955 | 4/1990 |
| JP | 2110464 | 4/1990 |
| JP | 2124936 | 5/1990 |
| JP | 02145511 | 6/1990 |
| JP | 2150426 | 6/1990 |
| JP | 2163744 | 6/1990 |
| JP | 2178330 | 7/1990 |
| JP | 2308806 | 12/1990 |
| JP | 3007766 | 1/1991 |
| JP | 3014456 | 1/1991 |
| JP | 3026716 | 2/1991 |
| JP | 3028852 | 2/1991 |
| JP | 3031325 | 2/1991 |
| JP | 3045628 | 2/1991 |
| JP | 3047883 | 2/1991 |
| JP | 03050459 | 3/1991 |
| JP | 3059016 | 3/1991 |
| JP | 3064337 | 3/1991 |
| JP | 3064753 | 3/1991 |
| JP | 3152544 | 6/1991 |
| JP | 3154007 | 7/1991 |
| JP | 3162441 | 7/1991 |
| JP | 3197135 | 8/1991 |
| JP | 3200257 | 9/1991 |
| JP | 3207774 | 9/1991 |
| JP | 3209476 | 9/1991 |
| JP | 3252246 | 11/1991 |
| JP | 3257027 | 11/1991 |
| JP | 3272131 | 12/1991 |
| JP | 05125187 | 5/1993 |
| JP | 06056560 | 3/1994 |
| JP | 6129153 | 5/1994 |
| JP | 7309882 | 11/1995 |
| JP | 7325383 | 12/1995 |
| JP | 2001-092122 | 4/2001 |
| JP | 2002-129103 | 5/2002 |
| JP | 2002-235037 | 8/2002 |
| JP | 2003-050459 | 2/2003 |
| JP | 2003-064306 | 3/2003 |
| JP | 2003-064307 | 3/2003 |
| JP | 2003-183575 | 7/2003 |
| JP | 2003-253204 | 9/2003 |
| JP | 2003-257963 | 9/2003 |
| JP | 2004-277501 | 10/2004 |
| JP | 2005-042118 | 2/2005 |
| JP | 2005-048190 | 2/2005 |
| JP | 2005-072615 | 3/2005 |
| JP | 2005-099693 | 4/2005 |
| JP | 2005-105281 | 4/2005 |
| JP | 2005-105282 | 4/2005 |
| JP | 2005-105283 | 4/2005 |
| JP | 2005-105284 | 4/2005 |
| JP | 2005-136429 | 5/2005 |
| JP | 2005-139265 | 6/2005 |
| JP | 2005-146282 | 6/2005 |
| JP | 2006-045352 | 2/2006 |
| JP | 2006-182811 | 7/2006 |
| JP | 2006-183028 | 7/2006 |
| JP | 2006-183029 | 7/2006 |
| JP | 2006-213908 | 8/2006 |
| JP | 2006-241407 | 9/2006 |
| JP | 2006-249181 | 9/2006 |
| JP | 2009084476 A | 4/2009 |
| WO | WO 90/03598 | 4/1990 |
| WO | WO 00/31183 | 6/2000 |
| WO | WO 00/41231 | 7/2000 |
| WO | WO 00/77575 | 12/2000 |
| WO | WO 01/29052 | 4/2001 |
| WO | WO 02/06402 | 1/2002 |
| WO | WO 02/16477 | 2/2002 |
| WO | WO 02/32823 | 4/2002 |
| WO | WO 03/044077 | 5/2003 |
| WO | WO 03/044078 | 5/2003 |
| WO | WO 03/044600 | 5/2003 |
| WO | WO 03052003 | 6/2003 |
| WO | WO 03/070809 | 8/2003 |
| WO | WO 03/088343 | 10/2003 |
| WO | WO 03/088344 | 10/2003 |
| WO | WO 03/089992 | 10/2003 |
| WO | WO 2004/044025 | 5/2004 |
| WO | WO 2005/036270 | 4/2005 |
| WO | WO 2005/037907 | 4/2005 |
| WO | WO 2005/049757 | 6/2005 |
| WO | WO 2005/080629 | 9/2005 |
| WO | WO 2006122308 | 11/2006 |
| WO | WO 2006/128232 | 12/2006 |
| WO | WO 2008/030364 | 3/2008 |
| WO | WO 2009/015119 | 1/2009 |
| WO | WO 2009/038250 | 3/2009 |
| WO | WO 2010/079495 | 7/2010 |
| WO | WO 2010 087233 | * 8/2010 |

OTHER PUBLICATIONS

Andrews, et al., "Spinnable and UV-Patternable Hybrid Sol-Gel Silica Glass for Direct Semiconductor Dielectric Layer Manufacturing", p. 347, SPIE 25th Annual Symposium on Microlithography, Feb. 27-Mar. 3, 2000.

Bohmer, M.R. et al., "Chapter 8: Sol-Gel Coatings For Optical And Dielectric Applications", Handbook of Advanced Electronic and Photonic Materials and Devices, vol. 5: © 2001, pp. 219-262.

Brewer et al. "The Reduction of the Standing-wave Effect in Positive Photoresists", Journal of Applied Photographic Engineering, Dec. 1981, vol. 7, No. 6, pp. 184-186.

Chou, et al., "Anti-Reflection Strategies for Sub-0.18.mu.m Dual Damascene Patterning in KrF 248nm Lithography", p. 453, SPIE 25th Annual Symposium on Microlithography, Feb. 27-Mar. 3, 2000.

Chun, et al., "Novel Hardening Methods of DUV Chemically Amplified Photoresist By ION Implanation and Its Application to New Organic ARC Material and Bilayer Process", p. 360, SPIE 25th Annual Symposium on Microlithography, Feb. 27-Mar. 3, 2000.

Del Puppo, Helene et al., "A Novel Organic Resist Removal and Cleaning Technology", p. 228, SPI 25.sup.th Annual Symposium on Microlithography, Feb. 27-Mar. 3, 2000.

Ding et al., Process and Performance Optimization on Bottom Anti-Reflective Coatings (Part II), p. 328, SPIE 25.sup.th Annual Symposium onMicrolithography, Feb. 27-Mar. 3, 2000.

Honeywell, "Material Safety Data Sheet, Accuglass T-04 Spin-On Glass", Jun. 30, 1998, pp. 1-7.

International Search Report and Written Opinion issued in PCT/US2010/037898, mailed Jan. 24, 2011, 11 pages.

Korchkov, et al. entitled "Low Temperature Dielectric Films From Octavinylsilsequioxane", Dec. 1982, pp. 373-376.

Lamola, A. et al., "Chemically Amplified Resists," Solid State Technology, 53-60 (Aug. 1991).

Lavrent'yev, et al. entitled "Polyhedral Oligosilsesquioxanes and Their Homo Derivatives", Aug. 1981, pp. 199-236.

Lin et al, "Dual Layer Inorganic SiON Bottom ARC for 0.25 um DUV Hard Mask Applications", p. 246, SPIE 25.sup.th Annual Symposium of Microlithography, Feb. 27-Mar. 3, 2000.

Lu, "Performance impact of novel polymetric dyes in photoresist application", p. 346, SPIE 25th Annual Symposium on Microlithography, Feb. 27-Mar. 3, 2000.

(56) References Cited

OTHER PUBLICATIONS

Lucus, et al., "Anti-Reflective Coating Optimizing Techniques for sub-0.2um Geometrics", Motorola, Advanced Products Research and Development Lab, p. 171, SPIE 25.sup.th Annual Symposium on Microlithography, Feb. 27-Mar. 3, 2000.
Meador, "Recent Progress in 1993 nm Anti-reflective Coatings", p. 311, SPIE 25.sup.th Annual Symposium on Microlithography, Feb. 27-Mar. 3, 2000.
Mizutani, et al., "Design of a new bottom anti-reflective Coating Composition for KrF resist", p. 277, SPIE 25.sup.th Annual Symposium on Microlithography, Feb. 27-Mar. 3, 2000.
Nakaoka, et al., "Comparison of CD variation between organic and inorganic bottom anti-reflective coating on Topographic Substrates", p. 454, SPIE 25th Annual Symposium on Microlithography, Feb. 27-Mar. 3, 2000.
Onishi, "Application of Polysilanes for Deep UV anti-reflective Coating", p. 248, SPIE 25.sup.th Annual Symposium on Microlithography, Feb. 27-Mar. 3, 2000.
Pacansky, et al. entited "Photochemical Decomposition Mechanisms for AZ-Type Photoresists", Jan. 1979, pp. 42-55.
Padmanaban, M. et al., "Bottom Anti-Reflective Coatings for ArI, KrF, and I-line Applications: A Comparison of Theory, Design and Lithographic Aspects", p. 281, SPIE 25.sup.th Annual Symposium on Microlithography, Feb. 27-Mar. 3, 2000.
Schiavone, et al., "SiON based Anti-reflective Coating for 193nm Lithography", p. 335, SPIE 25.sup.th Annual Symposium on Microlithography, Feb. 27-Mar. 3, 2000.
Singer, "Anti-Reflective Coatings: A Story of Interfaces" Semiconductor International, pp. 55-60 (Mar. 1999).
Stephen, et al., "Antireflective Coating for 193nm Lithography", p. 355, SPIE 25th Annual Symposium on Microlithography, Feb. 27-Mar. 3, 2000.
Taylor, et al., Methyacrylate Resists and Antireflective Coatings for 193 nm "Lithography", p. 245, SPIE 25.sup.th Annual Symposium on Microlithography, Feb. 27-Mar. 3, 2000.
Trefonas, "Organic Anti-Reflective Coatings for 193nm Lithography", p. 298, SPIE 25.sup.th Annual Symposium on Microlighotraphy, Feb. 27-Mar. 3, 2000.
van Wingerden, "Joint optimisation of substrate reflectivity, resist thickness and resist absorption for CD control and resolution", p. 451, SPIE 25th Annual Symposium on Microlithography, Feb. 27-Mar. 3, 2000.
Willson, C.G., "Organic Resist Materials—Theory and Chemistry," Introduction to Microlithography, American Chemical Society, 87-159 (1983).
Yamanaka, et al., "Suppression of Resist Pattern Deformation on SiON Bottom Anti-Reflective Layer for Deep UV Lithography", p. 247, SPIE 25.sup.th Annual Symposium on Microlithography, Feb. 27-Mar. 3, 2000.
Brogren, Maria et al., "Optical Efficiency of a PV-Thermal hybrid CPC Module For High Latitudes", Solar Energy vol. 69(Suppl), No. 1-6, pp. 173-185, 2000.
European Search Report mailed Oct. 18, 2012 from the European Patent Office in European Patent Application No. 10786741.8.
Honeywell ACCUGLASS.RTM. T-08 Spin-On Glass Material Safety Data Sheet dated Jun. 19, 2002, Revision A.
Honeywell ACCUSPIN.RTM. 720 Spin-On Glass Material Safety Data Sheet dated Mar. 7, 2000.
Nagel, H. et al., "Porous $SiO_2$ films prepared by remote plasma-enhanced chemical vapour deposition—a novel antireflection coating technology for photovoltaic modules", Solar Energy Materials & Solar Cells, vol. 65 (2001) pp. 71-77.
Sermon, P.A. et al., "MgF2 Xerogels", Journal of Sol-Gel Science and Technology, vol. 32, 149-153, 2004.
Vergohl, M. et al., "Ex situ and in situ spectroscopic ellipsometry of MF and DC-sputtered TiO2 and SiO2 films for process control", Thin Solid Films, vol. 351 (1999) pp. 42-47.
Xiao, Yiqun et al., "Microstructure Control of nanoporous Silica Thin Film Prepared by Sol-gel Process", J. Mater. Sci. technol., vol. 23, No. 4, 2007, pp. 504-508.
Zhang, Xin-Tong et al., "Self-Cleaning Particle Coating with Antireflection Properties", Chem. Mater. 2005, vol. 17, pp. 696-700.
International Search Report and Written Opinion issued in PCT/US2010/030255, mailed Sep. 3, 2010, 10 pages.
Written Opinion and International Search Report mailed Jan. 31, 2013 in International Application No. PCT/US2012/037734.
Akamatsu, Yoshinori et al., "Effect of the Additives in Sols on the Surface Roughness of the Coating Films Derived from Mixtures of Tetraethoxysilane- and Methyltriethoxysilane-Derived Sols", Journal of the Ceramic Society of Japan III(9) 636-639 (Sep. 2003).
Coles, A.X. et al., "Optimization of Porous Silicon Reflectance for Solar Cell Applications", Mat. Res. Soc. Symp. Proc. vol. 426 Materials Research Society, pp. 557-562 (Jan. 1996).
Crivello et al., Diaryhodonium Salts as Thermal Initiators of Cationic Polymerication, Journal of Polymer Science: Polymer Chemistry Edition, vol. 21, pp. 97-109 (Jan. 1983).
Dynasylan® brochure entitled "Silanes for Adhesives and Sealants", 5 pages, available at www.dynasylan.com (Jul. 2009).
Hawley's Condensed Chemical Dictionary, 11th ed., 85-86. (Jan. 1, 1987).
Izumi, Yusuke et al., "Hydrosilyation of Carbonyl Compounds Catalyzed by Solid Acids and Bases," Tetrahedron Letters, vol. 32, No. 36, pp. 4744 (1991) (No month available).
Jaskot et al., "Toxicity of an Anthraquinone Violet Dye Mixture Following Inhalation Exposure, Intratracheal Instillation, or Gavage", Fundamental and Applied Toxicological 22, 103-112 (Jan. 1994).
Lavrent'yev, et al. entitled "Ethylmethyloctasesquioxanes: Products of the Reactions of Ethylpolycyclosiloxanes with Tricholormethylsilane. Their Chromatographic Mass Spectrometric Investigation," vol. 51, No. 1, pp. 124-130 (Jan. 1981).
Li, et al. entitled "An Organosiloxane Spin On Bottom Antireflective Coating for ArF Lithography", pp. 1-9 (No month or year available).
Li, et al. entitled "Organosiloxane Based Bottom Antireflective Coatings for 193nm Lithography", pp. 1-10 Advanced in Resist Technology and Processing xx11, 449 (Sep. 2005).
Lien, Shui-Yang et al., "Tri-layer antireflection coatings (SiO2/SiO2-TiO2/TiO2) for silicon solar cells using a sol-gel technique", Solar Energy Materials & Solar Cells 90 2710-2719 (Oct. 2006).
Lin et al. "Linewidth Control Using Anti-Reflective Coating for Optical-Lithography", pp. 399-402 (Dec. 1982).
Lin, Yi-Ching et al., "Some Aspects of Anti-Reflective Coating for Optical Lithography," Advances in Resist Technology and Processing, Proc., SPIE vol. 469, 30-37 (May 1984).
McKean et al., "Characterization of a Novolac-Based Three-Component Deep-UV Resist," Chem. Mater. 2, 619-624. (Sep. 1990).
Nalamasu et al., "Development of a Chemically Amplified Positive (CAMP) Resist Material for Single Layer Deep-UV Lithography," Advances in Resist Technology and Processing VII, SPIE vol. 1262, 1990, pp. 32-41 (Jun. 1990).
Raboin, L. et al., "Nanostructured Sol-Gel Coatings for Optical Applications", Advances in Science and Technology vol. 55, pp. 199-204 (Sep. 2008).
Resiser "Photoreactive Polymers—Multilayer Techniques and Plasma Processing", pp. 359-367 (Feb. 1989).
Sheats, "Photobleaching Chemistry of Polymers Containing Anthracenes", pp. 332-348 (Oct. 1989).
Tanaka et al. "A New Photolighography Technique with Antireflective Coating on Resist: ARCOR", pp. 3900-3904. J. Electrochem. Soc. 137(12): 3900-3905 (Dec. 1990).
Wu, Guangming et al., "A novel route to control refractive index of sol-gel derived nano-porous silica films used as broadband antireflective coatings", Materials Science and Engineering B78 135-139 (Dec. 2000).

* cited by examiner

COATING FORMULATIONS FOR OPTICAL ELEMENTS

TECHNICAL FIELD

The invention relates generally to coating formulations for optical elements and more particularly to anti-reflective coatings for glass covers used in photovoltaic cell applications.

BACKGROUND

Anti-reflective (AR) coatings are used in several industries, including in the manufacture of photovoltaic (PV) modules, to reduce the reflection fraction of incident light as light passes through an optically transparent element such as glass. The goal of AR coatings for glass substrates is to achieve a refractive index that is as close to 1.23 as possible to maximize light transmission over a broad band of light wavelengths.

One or more layers of a low refractive index coating can achieve improved transmittance in a broad wavelength range and a wide range of incident angles. Such coatings can be deposited (at atmospheric pressure or without vacuum) via sol-gel processes and can be highly cost-effective. These thin anti-reflective coatings, which may be formed from a silicon dioxide precursor applied to the glass by conventional coating techniques, have been reported to improve solar light transmittance by about two to three percent in the visible portion of the light spectrum. Such sol-gel materials have been formed using several mechanisms including via hydrolysis/condensation reaction of alkoxysilanes. See, e.g., G. Wu et al., "*A novel route to control refractive index of sol-gel derived nanoporous films used as broadband antireflective coatings*," Materials Science and Engineering B78 (2000), pp. 135-139.

Sol-gel coatings can be applied to optically transparent elements using a variety of methods, including spin-on, slot die, spray, dip, curtain, roller and other coating techniques. The total amount of solids as expressed in terms of oxides included in the coating formulation may be varied from about 1 to about 25 weight percent depending upon the application method. Conventional solvent systems used in sol gel processes generally have low boiling points and high volatility so that they evaporate rapidly after the coating is applied to the substrate in order to minimize cure time and temperature conditions.

One challenge with certain wet coating application methods, and in particular certain continuous coating methods, is that it is difficult to achieve a uniform coating on the optically transparent substrate(s). The use of sol-gel coating formulations comprising conventional low boiling solvent systems tend to exhibit an increased concentration of solids and/or viscosity over time resulting in a non-uniform coating. This can lead to quality assurance challenged as well as increased material costs.

SUMMARY

Embodiments disclosed herein pertain to coating formulations, optical elements such as photovoltaic modules that employ such coating formulations, and improved processes for preparing sol gel formulations and/or applying sol gel formulations to optical elements.

One embodiment is a coating formulation including at least one alkoxysilane residue and at least about 50 wt % solvent having a boiling point of at least about 125° C. at atmospheric pressure.

Another embodiment is a method of forming an optically transparent element, in which a coating formulation is applied onto a portion of an optically transparent substrate by roller coating or another coating application and is then heated to form a coating such as an anti-reflective coating. The coating formulation comprises at least one alkoxysilane residue and at least about 50 wt % of at least one solvent having a boiling point of at least 125° C. at atmospheric pressure.

A further embodiment is a method of producing a coating formulation in which at least one alkoxysilane is combined with high boiling solvent under suitable conditions to form the formulation.

DETAILED DESCRIPTION

In one embodiment, the invention provides a coating formulation which comprises at least one alkoxysilane residue, at least one high boiling solvent, optional water and an optional catalytic amount of an acid or base. The coating formulation may be free or substantially free of low boiling solvents according to certain embodiments.

A variety of commercially available alkoxysilanes may be used to form the coating formulation. Suitable alkoxysilanes may have the following general formula:

wherein at least 2 of the R groups are independently $C_1$ to $C_4$ alkoxy groups and the balance, if any, are independently selected from the group consisting of hydrogen, alkyl, phenyl, halogen, substituted phenyl. The term alkoxy includes any other organic group which can be readily cleaved from silicon at temperatures near room temperature by hydrolysis. Suitable alkoxysilanes include tetraethoxysilane (TEOS) and tetramethoxysilane (TMOS). Additional examples include trialkoxysilanes such as methyltriethoxy silane (MTEOS), aminopropyltriethoxy silane (APTEOS) and APTEOS-triflate, vinyltriethoxy silane (VTEOS), and diethylphosphatoethyltriethoxy silane. Examples also include dialkoxysilanes such as methyldiethoxy silane (MDEOS) dimethyldiethoxy silane (DMDEOS), and phenyldiethoxy silane (PDEOS). Further examples include monoalkoxysilanes such as trimethoxy silanes, and in particular (3-glycidoxypropyl)-trimethoxy silane. Combinations of alkoxysilane materials may also be used.

In one embodiment, at least two alkoxysilane materials are used, with the first alkoxysilane being a tetraalkoxysilanes such as TEOS. The second alkoxysilane may include any trialkoxysilane, dialkoxysilane or monoalkoxysilane including those listed above. For example, MTEOS and/or VTEOS may be particularly suitable for improving adhesion and/or hardness. In one embodiment, the second alkoxysilane material or combination of materials may be combined with the first alkoxysilane material in an amount ranging from up to about 50 mol % to 40 mol % to 35 mol % to 25 mol % to 15 mol % based on the total moles of alkoxysilane material. In another embodiment, the second alkoxysilane material may be added in an amount ranging from at least about 10 mol % to at least about 40 mol % based on the total moles of both alkoxysilane materials. The molar ratio of the first alkoxysilane to the second alkoxysilane material may range from 1:1 to 1000:1, more particularly from 10:1 to 500:1 and even more particularly from 25:1 to 100:1.

Combinations of the foregoing materials may be utilized to achieve desirable coating properties. In one embodiment, the coating formulation includes TEOS and MTEOS. In another embodiment, the coating formulation includes TEOS, MTEOS, VTEOS. In a further embodiment, the coating formulation includes TEOS, MTEOS, VTEOS. Additional combinations of alkoxysilanes and methods of forming AR coating materials from such alkoxysilanes are disclosed in U.S. application Ser. No. 12/796,199, which is incorporated by reference herein in its entirety.

According to one embodiment, less than about 25 wt % alkoxysilane material, more particularly, less than about 15 wt % alkoxysilane material, even more particularly, less than about 10 wt % alkoxysilane material, even more particularly, less than about 5 wt % alkoxysilane material and even more particularly less than about 3 wt % alkoxysilane may be added to the coating formulation.

Suitable high boiling solvents may have a boiling point of at least about 125° C., more particularly at least about 150° C., more particularly, at least about 170° C., and even more particularly, at least about 185° C. at atmospheric pressure. In one embodiment, the high boiling solvent may comprise a glycol and/or an ether of a $C_1$ to $C_4$ alkyl which is miscible in water and alkoxysilanes. Such alkylene glycols may have a hydroxyl concentration of 0.021 mole/cm$^3$ or less and a weight average molecular weight of about 100 or more. Examples of suitable high boiling solvent composition components include ethylene glycol, propylene glycol, di(ethylene)glycol, tri(ethylene)glycol, tetra(ethylene)glycol, penta(ethylene)glycol, di(propylene)glycol, hexa(ethylene)glycol, as well as alkyl ethers of any of the foregoing. A particularly suitable example is di(propylene)glycol methyl ether. Combinations of high boiling solvents may also be suitable.

In one embodiment, the coating formulation includes at least about 50 wt % high boiling solvent (or solvent combination), more particularly, at least about 60 wt % high boiling solvent, even more particularly at least about 70 wt % high boiling solvent, even more particularly at least about 80 wt % high boiling solvent, and even more particularly at least about 90 wt % high boiling solvent.

In another embodiment, little or no low boiling point solvent is added to the coating formulation such that it is substantially free or completely free of low boiling solvents. It should be noted that the hydrolysis reactions that occur within the coating formulation may result in low boiling solvent byproducts such as methanol and ethanol. However, regardless of whether low boiling solvent is added or formed as a byproduct, the coating formulation may in one embodiment comprise less than 10 wt % solvent having a boiling point of less than 125° C. at atmospheric pressure, more particularly less than 5.0 wt % solvent having a boiling point of less than 125° C., even more particularly less than 1.0 wt % solvent having a boiling point of less than 125° C., and even more particularly less than 0.5 wt % solvent having a boiling point of less than 125° C. In other embodiments, the low boiling solvents in the concentration ranges provided herein have a boiling point of less than 150° C., more particularly 170° C., and even more particularly less than 185° C. at atmospheric pressure. In yet another embodiment, the coating formulation is free or substantially free of added ethanol and/or acetone.

The coating formulation may also include optional catalysts. Suitable acid catalysts include nitric acid, hydrochloric acid, sulfuric acid, acetic acid and other similar organic acids. Suitable base catalysts include ammonium hydroxide, quaternary amine compounds of the formula $R_1R_2R_3R_4N^+OH^-$ in which $R_1$, $R_2$, $R_3$ and $R_4$ are each independently phenyl, hydrogen or a $C_{1-16}$ alkyl. In some embodiments, suitable base catalysts include quaternary amine hydroxides such as tetrabutylammonium hydroxide and tetramethylammonium hydroxide. In some embodiments, suitable base catalysts include aqueous solutions of these components, and may optionally include additional distilled water beyond that found in the base catalyst aqueous solutions.

In a further embodiment the coating formulation may include one or more polyols, which may enhance the coating characteristics and other properties of the coating formulation. For example, the coating formation may include polyols having a hydroxyl value of about 14 mg KOH/g to about 590 mg KOH/g. Specific polyol classes include caprolactone polyols, polyethylene glycols, polypropylene glycols, and polycarbonate diols.

According to one embodiment, a coating formulation is formed by combining at least one alkoxysilane, at least one high boiling solvent, optional water, an optional catalytic amount of an acid or base and an optional polyol.

Depending on the alkoxysilane material(s) and optional catalyst used, the coating formulation can be formed under conditions causing partial or complete polymerization of the alkoxysilane material via hydrolysis and/or transesterification mechanisms prior to application to a substrate. For example the coating formulation components including a base catalyst may be combined and reacted in, for example, a jacketed stirred tank reactor (STR) via a batch or semi-batch mode for a suitable reaction time in the range of about 1 to about 6 hours, more particularly 1 to 3.5 hours and at a suitable temperature in the range of about 35° C. to 70° C.

Under the foregoing conditions, hydrolysis and condensation reactions may take place to form a polymer in solution. Depending on the reaction conditions, the polymer contained in the solution may vary from linear or randomly branched chains, to porous matrices, to dense colloidal particles. In any case, the resulting polymer will include residues of the alkoxysilane materials as described above. The term "residue" as used herein is intended to refer to a portion of the polymer molecule derived from the alkoxysilane initially added to the coating formulation. By way of example, it is generally known that 1 mole of tetraethoxysilane reacted under the foregoing conditions forms 1 mole of $SiO_2$, which would constitute one example of a tetraethoxy silane residue.

It will also be appreciated that certain by-products may be formed and contained in the coating formulation either as part of the polymer or as a separate component. For example, the hydrolysis of TEOS may result in the formation of ethanol as a by-product.

In one embodiment, the coating formulation may include less than 15 wt % $SiO_2$, more particularly less than about 10 wt % $SiO_2$, even more particularly less than about 5 wt % $SiO_2$, and even more particularly less than about 3 wt % $SiO_2$. Because the molar ratio of alkoxysilane:$SiO_2$ is known (or can be determined), the $SiO_2$ solids concentration can be calculated based on the amount of alkoxysilane (in grams) added to the mixture and the molecular weight of the alkoxysilane and $SiO_2$.

The SiO$_2$ solids concentration of a coating formulation can also be determined gravimetrically, for example, by adding a strong base to the coating formulation and then evaporating the liquid content to form pure SiO$_2$.

In another embodiment, the polymer includes at least one TEOS residue, at least one MTEOS residue or both. In another embodiment the polymer additionally includes at least one VTEOS residue.

To further control the reaction conditions, the pH of the coating formulation can be adjusted to between about 0 to about 4.0, more particularly, from about 0 to about 2.0 and even more particularly from about 0.5 to about 1.7 using an acid such as nitric acid after a suitable reaction time under basic conditions. This pH reduction may affect the polymerization conditions, which in turn controls the polymer particle size contained in coating formulation and subsequently cured coating. In one embodiment, the average particle size of the polymer in the coating formulation may be less than 10 nm, more particularly, less than 1 nm. The average particle size of the coating after curing may be between about 15 and about 100 nm, more particularly, between about 25 and about 75 nm, and the polymer may have a molecular weight in the range of about 25,000 to about 150,000 Dalton. The coating may also be further diluted with a low boiling solvent that includes one or more of water, IPA, acetone and/or PGMEA. Additional acid may be added during dilution to maintain a desired pH.

In an alternate embodiment the coating formulation is formed under conditions whereby the alkoxysilane material(s) remain in the form of polymer precursors until the coating formulation is applied onto a substrate and heat cured resulting in polymerization.

The coating formulation of embodiments of the invention is ready for use without removing the particles from solution. Additionally, the coating formulations formed by embodiments of the invention may remain stable for an extended period of time at ambient temperatures. Additionally, coating formulations of the present invention may be stored in a −20° C. to −40° C. freezer to extend shelf-life without materially impacting the optical or mechanical properties desired for glass coatings. The ability to preserve AR coatings for an extended period of time may provide a significant manufacturing advantage, particularly if the coating formulation is transported to an off-site location and/or stored for a period of time prior to use.

The coating formulation may be applied to an optically transparent substrate such as a glass substrate (e.g., sodalime glass, float glass, borosilicate and low iron sodalime glass), plastic cover, acrylic Fresnel lense or other optically transparent substrate.

The coating formulation may be applied onto a surface of an optically transparent element by a variety of generally known coating methods including spin-on, slot die, spray, dip, roller and other coating techniques. Depending on the application method, the coating formulation may be varied such that the solids concentration of the coating formulation ranges from about 1 to about 25 weight percent. In some embodiments, there may be manufacturing advantages to forming a more concentrated batch followed by diluting to a desired concentration on location. In alternate embodiments, dilution could occur prior to or during the initial mixing stage. In either case, high boiling solvents may be used to further dilute the coating formulation.

The coating formulation may be formed as one or more layers on the optically transparent substrate. In certain embodiments, layers comprising different materials or different component concentrations may be employed. In other embodiments, one or more layers may be formed from a material that is not an alkoxysilane. Such layers may be applied to the substrate prior to applying the coating formulation and/or on top of a coating layer formed from the coating formulation.

According to certain embodiments, the coating formulation may be applied using roller coating techniques. As shown schematically in FIG. 1, a conventional roller coating system 10 generally includes a conveyor 12, an application roller 14, which may rotate the same direction as (forward roller) or in the opposite direction (reverse roller) of the conveyor 12, a metering roller 16 for controlling the application of the coating formulation, a support or pressure roller 18, an equalizing roller 19, at least one stabilizing roller 20 and a coating reservoir 22. As a glass substrate 24 moves along conveyor 12, coating formulation transferred from the coating reservoir 22 to the application roller 14 is applied to the substrate 24 in a generally uniform thickness. A significant benefit of the present invention is that the coating formulation has low volatility due to the use of a significant concentration of high boiling solvents. Consequently the evaporation rate of the solvent in the coating formulation residing in the reservoir 22 is substantially reduced, which results in a more uniform application of the coating formulation in the continuous roller system 10 over time. Specifically, the high boiling solvents prevents a significant increase in solids concentration over time caused by evaporation of the solvent in the reservoir 22.

After application, the coating formulation is cured onto the optically transparent substrate. When applied to glass substrates, the coating formulation can be subjected to a high temperature heat tempering step, ranging from about 400° C. to about 750° C. depending on the glass composition, for between about 1 minute and about 1 hour to cure the coatings. Prior to the high temperature heating step, the coated substrate may first be subjected to a lower temperature heating step ranging from about 200° C. to about 300° C. It will be appreciated that the various alkoxysilane precursors or polymers described above may undergo further modifications during the heating processes.

Optical elements coated with formulations according to embodiments of the present invention may possess improved light transmittance characteristics. For example, the coating may have a thickness of between about 100-150 nm, a refractive index in the range of about 1.15 to about 1.3, up to about a 3.5 percent transmission gain in the wavelength range of 350 to 1100 nm. If both sides of the optically transparent substrate are coated, additional transmission gains may be achieved. Exemplary data relating to these properties are presented in the Examples section set forth below.

Figure 2:
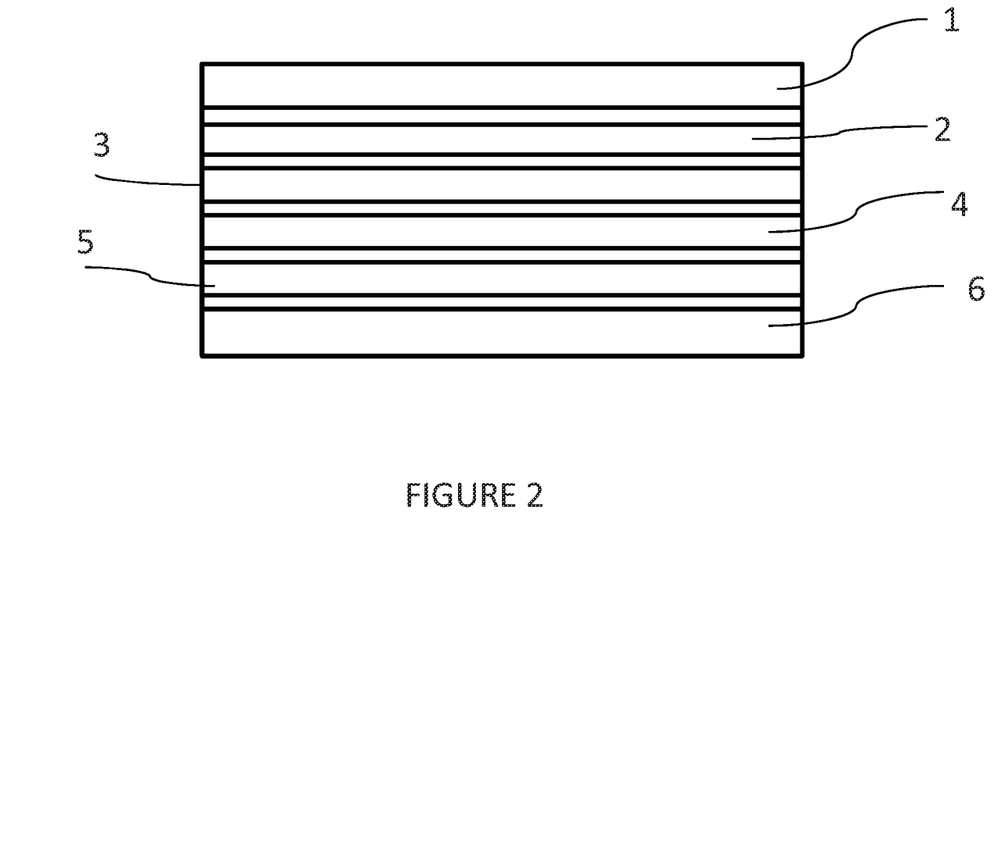
FIG. 2 provides a schematic illustration of a photovoltaic cell including a coating in accordance with an embodiment of the invention.

FIG. 2 is a cross-sectional view of a photovoltaic module (e.g., solar cell) for converting light to electricity, according to an embodiment of this invention. Incoming or incident light from the sun or the like is first incident on AR coating 1, passes therethrough and then through glass substrate 2 and front transparent electrode 3 before reaching the photovoltaic semiconductor (active film) 4 of the module. The module may also include, but does not require, a reflection enhancement oxide and/or EVA film 5, and/or a back metallic contact and/or reflector 6 as shown in FIG. 2. Other types of photovoltaic devices may of course be used, and the FIG. 2 module is merely provided for purposes of example and understanding. It will also be understood that a module may include a single AR coated optically transparent substrate that covers multiple photovoltaic cells connected in series.

As explained above, the coating 1 reduces reflections of the incident light and permits more light to reach the thin film semiconductor film 4 of the photovoltaic module thereby permitting the device to act more efficiently. While certain of the coatings 1 discussed above are used in the context of the photovoltaic devices/modules, this invention is not so limited. AR coatings according to this invention may be used in other applications. Also, other layer(s) may be provided on the glass substrate under the coating so that the coating is considered disposed on the glass substrate even if other layers are provided therebetween.

EXAMPLE 1

Di(propyleneglycol) methyl ether ("DPM") ((640.90 g) b.p. 190° C., vapor pressure 0.37 mBar), 80.62 g (0.387 mol) tetraethoxysilane, and 38.89 g (0.218 mol) methyltriethoxysilane were added to a 2 L round-bottom flask with a mechanical stirrer. As the components were mixed vigorously with the stirrer, a mixture of 6.242 g of 1.0M tetrabutylammonium hydroxide ("TBAH") (7.52 mmol) in methanol and 200.243 g (11.11 mol) DI water was gradually added (over ~30 sec) to the reaction mixture. After stirring the reaction mixture for 24 h at room temperature, 3.12 g of 35% HNO3 was added and the resulting mixture was stirred for an additional 15 minutes.

A 5 g of sample of the mixture ("Mixture A") was diluted with 5 g of Di(propyleneglycol) methyl ether to form a coating formulation ("Formulation A"). A first sample of Formulation A was spin-coated onto a surface of a 4" Si wafer (15 sec at 1300 rpm using lab scale spin coater). The coated wafer was heated for 2 min at 100° C. and then for 4 min at 625° C. The resulting film had a thickness of 128 nm and a refractive index of 1.28 (550 nm). Both measurements were taken with an n&k Analyzer 1200 from n&k Technology Inc., San Jose, Calif.

A second sample of Formulation A was spin-coated on a 4" square piece of low-iron solar float glass (15 sec at 1300 rpm using lab scale spin coater), The coated wafer was heated for 3 min at 100° C. and then for 4 min at 625° C. A transmission scan of the coated glass using a Hitachi brand spectrophotometer indicated that transmission in the range of 350-850 nm was improved by about 2.8% over that of uncoated reference glass.

EXAMPLE 2

Figure 1:
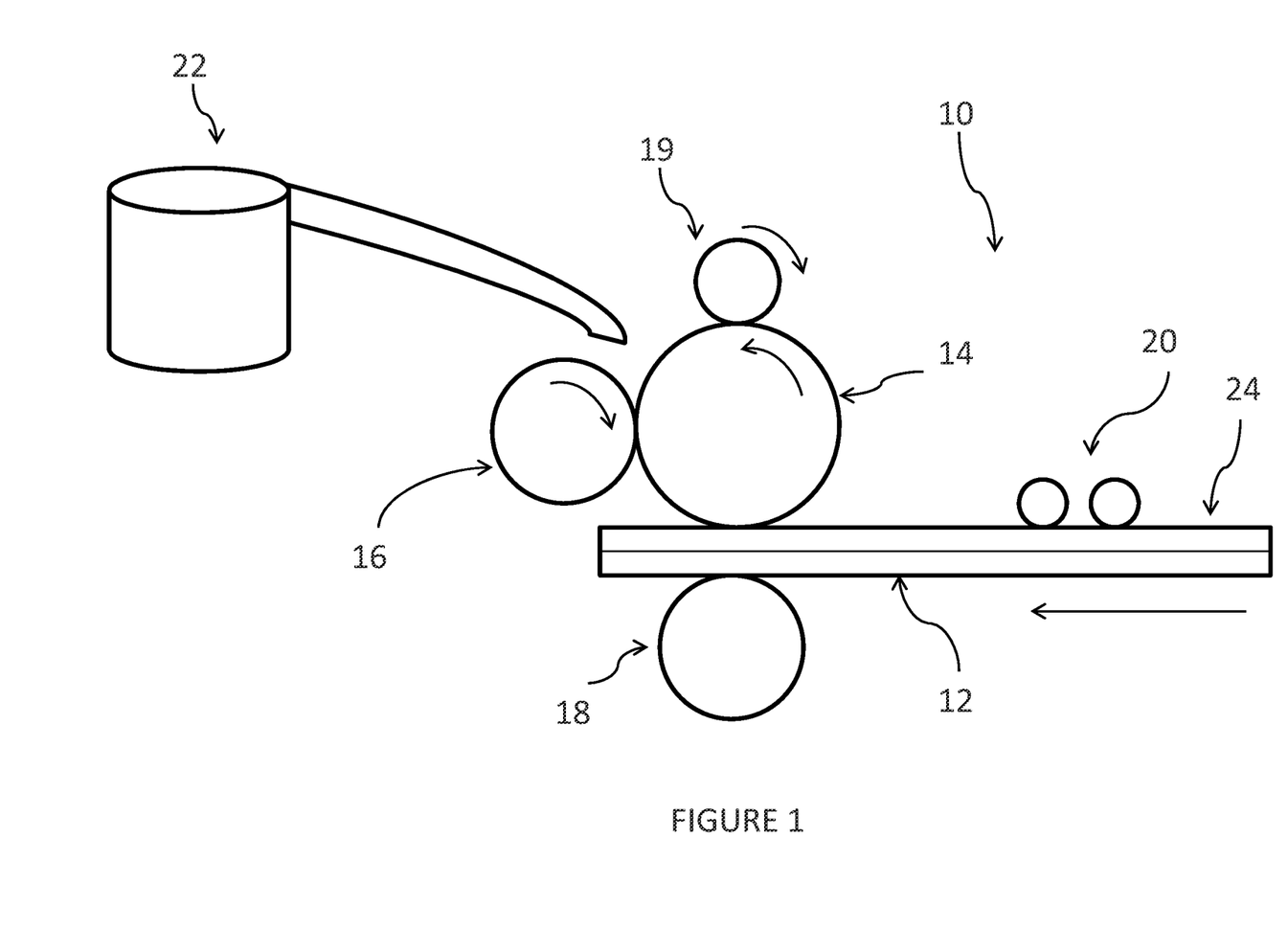
FIG. 1 is a schematic illustration of an exemplary roller coating system according to one embodiment of the present invention.

A volume of Formulation A was formed as described in Example 1 and added to a reservoir used in a continuous reverse roller coat process schematically represented in FIG. 1. A rubber applicator roll was set to turn in the opposite direction of a glass substrate disposed on a conveyor. The roller coat controller was set to deposit about 6 ml of formulation per square meter of glass resulting in a wet film thickness of about 6 microns. The coated glass substrate was then heated at between 200° C. and 250° C. in a conveyor oven moving at about 12 ft/minute, and then heated at about 650° C. in a box furnace for about 7 minutes. A transmission scan of the coated glass using a Hitachi brand spectrophotometer indicated that transmission in the range of 350-850 nm was improved by about 2.5% over that of uncoated reference glass.

EXAMPLE 3

A volume of Formulation A was diluted with di(propyleneglycol) methyl ether to obtain a coating formulation having a solids concentration of 1.5 wt %. The resulting coating formulation was employed in a reverse roller coat process as described in Example 2, and also in a forward roller coat process in which the applicator roller was turned in the same direction the glass on the conveyor. For the reverse roller coat process, the application roller was set to deposit about 8 ml of coating formulation per square meter of glass resulting in a wet film thickness of about 8 microns. For the forward roller coat process the application roller was set to deposit about 6 micron thickness wet coating. The coated glass substrate was then heated at between 200° C. and 250° C. in a conveyor oven moving at about 12 ft/minute, and then heated at about 650° C. in a box furnace for about 7 minutes. A transmission scan of the coated glass using a Hitachi brand spectrophotometer indicated that transmission in the range of 350-850 nm was improved by about 2% over that of uncoated reference glass for the reverse process and about 3% for the forward process.

EXAMPLE 4

A 2 g sample of Mixture A as formed in Example 1 was diluted with 3 g of di(propyleneglycol) methyl ether (Formulation B) and divided into five samples. To four of the samples, 0.0100 g, 0.0175 g, 0.0250 g and 0.0375 g, respectively, of a 10% formulation of BYK-307 in ethanol was added. BYK-307 is a polyether modified polydimethylsiloxane available from BYK USA Inc. The resulting samples included 0.0 wt %, 0.02 wt %, 0.035 wt %, 0.50 wt % and 0.075% of BYK-307. The samples were spin-coated on 4" square pieces of solar float glass (15 sec at 650 rpm), heated at 5 min at 250° C. and then for 5 min at 650° C. The samples that included BYK-307 provided improved wetting properties compared to the sample that did not include BYK-307.

EXAMPLE 5

A 4.05 g sample of Mixture A as formed in Example 1 was diluted with 5.95 g of di(propyleneglycol) methyl ether ("Formulation C"). Another 4.05 g sample of Mixture A was diluted with 3.00 g CAPA-2043, a polycaprolactone polyol and 2.95 g of di(propyleneglycol) methyl ether so that the resulting formulation ("Formulation D") was composed of 30 wt % CAPA-2043. A third sample of Mixture A was diluted with 3.00 g CAPA-3022, a caprolactone polymer with diethyleneglycol and glycerol and 2.95 g of di(propyleneglycol) methyl ether so that the resulting formulation ("Formulation E") was composed of 30 wt % CAPA-3022.

Formulations C, D and E were each spin-coated onto 4" Si wafers (15 sec at 800 rpm), heated for 5 min at 250° C. and heated for 5 min at 650° C. Film properties of each coated wafer were measured on the n&k Analyzer 1200. The coating formed from Formulation C had a thickness of 144 nm and a refractive index of 1.30. The coating formed from Formulation D had a thickness of 260 nm and a refractive index of 1.16. The coating formed from Formulation E had a thickness of 250 nm and a refractive index of 1.17.

Formulations C, D and E were also each spin-coated onto 4" square pieces of solar float glass (15 sec at 650 rpm), heated for 5 min at 250° C. and then for 5 min at 650° C. The coating formed from AR Solution D possessed the best wetting characteristics of the three coatings.

EXAMPLE 6

The coating formulations set forth in Table 1 were prepared by combining Mixture A from Example 1 with the solvent and any listed additives.

TABLE 1

| Coating Formulation | Mixture A | DPM | CAPA-2043 | CAPA-3022 |
|---|---|---|---|---|
| F | 4.05 g | 5.95 g | | |
| G | 4.05 g | 4.95 g | 1.00 g | |
| H | 4.05 g | 4.95 g | | 1.00 g |
| I | 4.05 g | 5.45 g | 0.50 g | |
| J | 4.05 g | 5.45 g | | 0.50 g |

Each coating formulation was spin-coated onto 4" Si wafers (15 sec at 650 rpm), heated for 5 min at 250° C. and heated for 5 min at 650° C. Films properties of each coated wafer were measured with the n&k 1200 Analyzer. Results are set forth in Table 2 below.

TABLE 2

| AR Coating formulation | Thickness | Refractive Index |
|---|---|---|
| F | 142 | 1.30 |
| G | 332 | 1.15 |
| H | 352 | 1.14 |
| I | 318 | 1.14 |
| J | 316 | 1.13 |

Each AR coating formulation was also spin-coated onto 4" square pieces of solar float glass (15 sec at 650 rpm), heated for 5 min at 250° C. and then for 5 min at 650° C. Wetting properties were similar for each sample.

EXAMPLE 7

Tri(ethyleneglycol) dimethyl ether ((13.80 g) b.p. 216 C), 1.736 g (8.33 mmol) tetraethoxysilane, and 0.837 g (4.70 mmol) methyltriethoxysilane were mixed in a 60 mL glass bottle with magnetic stir-bar. A mixture of 0.134 g of 1.0M tetrabutylammonium hydroxide (0.16 mmol) in methanol and 2.875 g (160 mmol) DI water was gradually (in ~30 sec) added to the reaction mixture with vigorous stirring. After stirring for 19 h at room temperature, the reaction mixture was acidified with 64.0 µL of 35% HNO3, and stirred for 15 min.

A 5 g amount of the mixture was diluted with 5 g of di(propyleneglycol) methyl ether. The formulation was spin-coated onto 4" Si-wafer (15 sec at 1100 rpm), heated for 2 min at 100° C. and then heated for 4 min at 625° C. Coating thickness (68 nm), and refractive index (1.32 at 550 nm) were measured using the n&k 1200 Analyzer.

EXAMPLE 8

Di(propyleneglycol) methyl ether ((23.24 g) b.p. 190 C, vapor pressure 0.37 mBar), 2.923 g (14.0 mmol) tetraethoxysilane, 1.411 g (7.90 mmol), methyltriethoxysilane, 0.513 (28.5 mol) DI water, and 0.226 g of 1.0M tetrabutylammonium hydroxide (0.27 mmol) were mixed in a 60 mL glass bottle with a magnetic stir-bar. After stirring for 2 h at room temperature, 106.0 µL of 35% HNO3 was added and the coating formulation was stirred for 15 min more.

A 1 g of sample of the mixture was spin-coated on a 4" Si-wafer (15 sec at 1300 rpm), heated for 2 min at 100° C. and then heated for 4 min at 625° C. Coating thickness (198 nm), and refractive index (1.33 at 550 nm) were measured using an n&k measurement tool.

EXAMPLE 9

Di(propyleneglycol) methyl ether ((123.25 g) b.p. 190 C, vapor pressure 0.37 mBar), 15.5 (7.44 mmol) tetraethoxysilane, 7.48 g (4.2 mmol) methyltriethoxysilane, 38.51 (2.14 mol) DI water, and 0.26 g of 35% $HNO_3$ (1.45 mmol) were combined and after mixing thoroughly the mixture was divided into 3 equal portions. After conducting sol-gel processes under acidic conditions for 22 min, 37 min, and 54 min at room temperature, for the three portions, respectively, 0.80 g of 1.0M tetrabutylammonium hydroxide solution (0.97 mmol) was added to increase the pH of each reaction mixture and conduct sol-gel process under basic conditions. After stirring for 1.5 h at room temperature, 35% HNO3 was added to each portion to lower the pH again to acidic conditions, and stirred for 15 min.

A 1 g sample of each portion was spin-coated onto 4" Si-wafers (15 sec at 2000 rpm), heated for 2 min at 100° C. and the heated for 4 min at 625° C. Coating thickness (150-220 nm), and refractive index (1.33 to 1.36 at 550 nm) were measured using the n&k 1200 Analyzer.

EXAMPLE 10

A 1-L reactor fitted with a condenser, a thermocouple, a sample port and a stir bar is charged with 616 gm of di(propyleneglycol) methyl ether, propylene glycol, ethylene glycol, or a mixture of any one of the foregoing under stirring and 77.49 g TEOS and 37.38 g MTEOS are then added into the reactor. A mixture of 6 g of 26% TBAH in methanol and 64.155 g of DI water is added to the reaction mixture under stirring. The mixture is then heated to 55° C., and maintained at 55° C. for 2-3 h. After the reaction is completed, 3.6 g of 35% HNO3 in water is added directly into the mixture at 55° C. to quench the reaction. The reaction mixture is then cooled to room temperature and diluted with a solvent such as DPM, propylene glycol and a co-solvent or additive to a specific concentration. The diluted formulation is then spun on silicon and glass to make films at 1500 rpm for 35 sec. The wet film is then heated at 675° C. for 5 min, and thickness (100-150 nm), refractive index (1.21-1.23) and transmittance (3% gain over 350-850 nm) are all measured.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The invention claimed is:

1. A coating formulation comprising:
   at least one alkoxysilane residue; and
   at least 80 wt % of at least one solvent having a boiling point of at least 185° C. at atmospheric pressure.

2. The coating formulation of claim 1 comprising at least 90 wt % of the at least one solvent.

3. The coating formulation of claim 1 wherein the coating formulation comprises less than 5 wt % of at least one solvent having a boiling point of less than 125° C. at atmospheric pressure.

4. The coating formulation of claim 1 wherein the coating formulation comprises less than 5 wt % of at least one solvent having a boiling point of less than 150° C. at atmospheric pressure.

5. The coating formulation of claim 1 wherein the coating formulation comprises less than 5 wt % of at least one solvent having a boiling point of less than 170° C. at atmospheric pressure.

6. The coating formulation of claim 1 wherein the coating formulation comprises less than 5 wt % of at least one solvent having a boiling point of less than 185° C. at atmospheric pressure.

7. The coating formulation of claim 1 comprising less than 10 wt % silicon dioxide solids concentration.

8. The coating formulation of claim 1 comprising less than 5 wt % silicon dioxide solids concentration.

9. The coating formulation of claim 1 comprising a tetraalkoxysilane residue.

10. The coating formulation of claim 9 wherein the at least one alkoxysilane residue comprises at least a second alkoxysilane residue selected from the group consisting of trialkoxysilane residues, dialkoxysilane residues, monoalkoxysilane residues, and combinations thereof.

11. The coating formulation of claim 1 further comprising at least one catalyst.

12. The coating formulation of claim 1 wherein the coating formulation comprises a pH of less than 5.

13. The coating formulation of claim 1 wherein the solvent comprises at least one alkylene glycol.

14. The coating formulation of claim 1 wherein the solvent is selected from at least one of ethylene glycol, propylene glycol, di(ethylene)glycol, tri(ethylene)glycol, tetra(ethylene)glycol, penta(ethylene)glycol, di(propylene)glycol, hexa(ethylene)glycol, and di(propylene)glycol methyl ether.

15. A coating formulation comprising:
at least one alkoxysilane residue;
at least about 50 wt % of at least one solvent having a boiling point of at least 125° C. at atmospheric pressure; and
at least one polyol comprising at least one polyethylene or polycaprolactone polyol.

16. A method of forming an optical element comprising:
applying at least one layer of a coating formulation onto at least a portion of an optically transparent substrate, wherein the coating formulation comprises at least one alkoxysilane residue and at least 80 wt % of at least one solvent having a boiling point of at least 185° C. at atmospheric pressure; and
heating the coating formulation to form a reflective coating on the optically transparent substrate.

17. The method of claim 16, wherein the applying step comprises roller coating the coating formulation onto at least a portion of an optically transparent substrate.

18. The method of claim 16 wherein the coating formulation is substantially free of solvent having a boiling point of less than 125° C. at atmospheric pressure.

19. The method of claim 16 wherein the heating step comprises heating the coating formulation at from at least about 200° C.

20. The method of claim 16 wherein the heating step further comprises heating the coating formulation at from at least about 400° C.

21. The method of claim 16, wherein the heat step comprises initially heating the coating formulation at between about 200° C. and 400° C. and then subsequently heating the coating formulation at between about 400° C. and 750° C.

22. A method of producing a coating formulation, comprising: combining at least one alkoxysilane, at least one catalyst and at least one solvent having a boiling point of at least 185° C. at atmospheric pressure to form a coating formulation, wherein the coating formulation comprises at least 80 wt % of the at least one solvent.

23. The method of claim 22 wherein the coating formulation is substantially free of low boiling solvent having a boiling point of less than 125° C. at atmospheric pressure.

24. The method of claim 22 wherein the catalyst comprises a base catalyst.

25. The method of claim 22 further comprises the steps of maintaining the pH of the coating formulation for a sufficient period of time at a sufficient temperature to form polymer particles and then reducing the pH of the coating formulation to less than about 5.0.

26. The method of claim 25, further comprising the step of adding an additional amount of solvent having a boiling point of at least 125° C.

27. The method of claim 22, wherein the coating formulation comprises at least about 90 wt % of the at least one solvent.

* * * * *